United States Patent [19]

Hecht et al.

[11] Patent Number: 5,032,979
[45] Date of Patent: Jul. 16, 1991

[54] DISTRIBUTED SECURITY AUDITING SUBSYSTEM FOR AN OPERATING SYSTEM

[75] Inventors: Matthew S. Hecht, Potomac; Abhai Johri; Tsung T. Wei, both of Gaithersburg, all of Md.; Douglas H. Steves, Austin, Tex.

[73] Assignee: International Business Machines Corporation, Armonk, N.Y.

[21] Appl. No.: 542,688

[22] Filed: Jun. 22, 1990

[51] Int. Cl.[5] .................... H04L 9/00; G06F 15/16; G06F 13/00
[52] U.S. Cl. ............................... 364/200; 364/280.6; 364/286.4; 364/228; 364/222.5; 380/4; 380/25
[58] Field of Search ... 364/200 MS File, 900 MS File; 380/4, 25; 371/11.1

[56] References Cited

U.S. PATENT DOCUMENTS

| | | | |
|---|---|---|---|
| 4,558,413 | 12/1985 | Schmidt et al. | 364/200 |
| 4,621,325 | 11/1986 | Naftzger et al. | 364/406 |
| 4,672,572 | 6/1987 | Alsberg | 364/900 |
| 4,720,782 | 1/1988 | Kovalein | 364/200 |
| 4,734,865 | 3/1988 | Scullion et al. | 364/478 |
| 4,757,533 | 7/1988 | Allen et al. | 380/25 |
| 4,825,354 | 4/1989 | Agrawal et al. | 364/200 |
| 4,970,644 | 11/1989 | Berneking et al. | 364/422 |
| 4,977,594 | 12/1990 | Shear | 380/4 |

OTHER PUBLICATIONS

The Design of the Unix operating System—Maurice J. Bach, 1986, pp. 422-429.
An Introduction to Database Systems—C. J. Date, 1983, pp. 11-13.
J. Picciotto, "The Design of an Effective Auditing Subsystem," Proceedings of the 1987 IEEE Symposium on Security and Privacy, Oakland, Calif., pp. 13-22 (Apr. 1987).
T. A. Berson, et al., "KSOS—Development Methodology for a Secure Operating System," Proc. of the Natl. Comp. Conf., vol. 48, AFIPS Press, 1979, Montvale, N.J., pp. 365-372.
S. Kramer, "LINUS IV—An Experiment in Computer Security," Proc. of the 1984 Symposium on Security and Privacy, Oakland, Calif., Apr. 1984, pp. 24-33.
G. J. Popek et al., "UCLA Secure Unix," Proc. of the Natl. Comp. Conf., vol. 48, AFIPS Press, 1979, Montvale, N.J., pp. 355-364.
V. D. Gligor, et al., "On the Design and Implementation of Secure Xenix Workstations," IEEE Symposium on Security, 4/86, pp. 102-117.

Primary Examiner—Allen R. MacDonald
Assistant Examiner—Gopal C. Ray
Attorney, Agent, or Firm—John E. Hoel

[57] ABSTRACT

The distributed auditing subsystem invention runs in a UNIX-like operating system environment with a hierarchical file system. The invention provides an audit trail of accesses to the objects it protects and maintains and protects that audit trail from modification or unauthorized access or destruction. The audit data generated by the invention is protected so that read access to it is limited to those who are authorized for audit data. The invention enables the recording of events which are relevant to the maintenance of the security of the system, such as the use of identification and authentication mechanisms, the introduction of objects into a user's address space, the deletion of such objects, actions taken by computer operators and system administrators and/or system security officers, and other security relevant events. The invention generates an audit record for each recorded event which includes the date and time of the event, the user, the type of event, and the success or failure of the event. The invention performs an on-line compression of the audit trail log file using a UNIX-type daemon process. The audit daemon process has a restartable feature that enables it to recover after node failures.

10 Claims, 6 Drawing Sheets

ARCHITECTURE

DISTRIBUTED SECURITY AUDITING SUBSYSTEM FOR AN OPERATING SYSTEM

BACKGROUND OF THE INVENTION

1. Technical Field

The invention disclosed broadly relates to data processing and more particularly relates to providing security auditing features for a data processing system 2. Background Art Many data processing applications involve highly confidential information such as in financial applications, national security applications, and the like, where many user terminals are connected through terminal controllers to one of a plurality of data processors interconnected in a distributed processing network. Data files can be stored on storage devices which are commonly accessible by a plurality of data processors and terminals connected in the network. The diversity of nodes at which access can be had to the various data files stored throughout the network presents a significant security problem, where highly confidential messages and files are transmitted and stored in the system. The prior art has not provided an effective mechanism to prevent the unauthorized persons or programs from reading confidential data being transmitted over the distributed processing network and stored in the commonly accessible storage devices. In prior art data processing systems, communications paths and data accessing nodes have been penetrated by unauthorized persons or programs which divert, replicate or otherwise subvert the security of the confidential information being transmitted and stored in the network.

For national security applications, the U.S. Government has established a standard by which the security of data processing systems can be evaluated, that standard having been published in "Trusted Computer System Evaluation Criteria," U.S. Department of Defense, December 1985, DoD publication number 5200.28-STD (referred to herein as DoD Standard). The DoD Standard defines a trusted computer system as a system that employs sufficient hardware and software integrity measures to allow its use for processing simultaneously a range of sensitive or classified information. trusted computing base (TCB) is defined as the totality of protection mechanisms within a computer system, including hardware, firmware and software, the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters such as a user's clearance, related to the security policy. A trusted path is defined by the DoD Standard as a mechanism by which a person at a terminal can communicate directly with the trusted computing base. The trusted path mechanism can only be activated by the person or the trusted computing base and cannot be imitated by untrusted software. Trusted software is defined as the software portion of a trusted computing base.

As is set forth in the DoD Standard, a secure computer system will control access to information such that only properly authorized individuals or processes will have access to read, write, create or delete information. The DoD Standard sets forth six fundamental requirements to control access to information and to deal with how one can obtain credible assurances that this has been accomplished in a trusted computer system. The first requirement for a secure computer system is that the system must enforce a mandatory security policy that can effectively implement access rules for handling sensitive information. Those rules would include the requirement that no person lacking proper personnel security clearance can obtain access to classified information and also that only selected users or groups of users may obtain access to data based for example on a need to know. A second requirement for a secure computer system is that access control labels must be associated with information which is to be maintained secure. A third requirement for a secure computer system is that each access to information must be authorized based upon who is accessing the information and what class of information they are authorized to deal with. A fourth requirement for a secure computer system is that audit information must be selectively kept and protected so that actions which affect security can be traced to the responsible user. A trusted system must be able to record the occurrences of events which are relevant to security, in an audit log. The capability to select the audit events to be recorded is necessary in order to minimize the expense of auditing and to allow efficient analysis. Audit data must be protected from modification and unauthorized destruction so as to permit detection and later investigation of security violations. A fifth requirement for a secure computer system is that a system must contain hardware and software mechanisms that can be independently evaluated to provide sufficient assurance that the system enforces the first four requirements. A sixth requirement of a secure computer system is that trusted mechanisms that enforce these basic requirements must be continuously protected against tampering and/or unauthorized changes.

The problem of maintaining a secure computer system as defined in the DoD Standard is compounded for those systems which accommodate multiple users. Some examples of prior art multi-user operating systems which have not provided an effective mechanism for establishing a secure computer system as defined in the DoD Standard, include UNIX (UNIX is a trademark of AT&T Bell Laboratories), XENIX (XENIX is a trademark of Microsoft Corporation) and AIX (AIX is a trademark of the IBM Corporation). UNIX was developed and is licensed by AT&T as an operating system for a wide range of minicomputers and microcomputers. For more information on the UNIX Operating System, the reader is referred to "UNIX (TM) System, Users Manual, System V," published by Western Electric Company, January 1983. A good overview of the UNIX Operating System is provided by Brian W. Kernighan and Rob Pike in their book entitled "The UNIX Programming Environment," published by Prentice-Hall (1984). A more detailed description of the design of the UNIX Operating System is to be found in a book by Maurice J. Bach, "Design of the UNIX Operating System," published by Prentice-Hall (1986).

AT&T Bell Labs has licensed a number of parties to use the UNIX Operating System, and there are now several versions available. The most current version from AT&T is Version 5.2. Another version known as the Berkley version of the UNIX Operating System was developed by the University of California at Berkley.

Microsoft Corporation has a version known under their trademark as XENIX.

With the announcement of the IBM RT PC (RT and RT PC are trademarks of IBM Corporation), (RISC (reduced instruction set computer) technology personal computer) in 1985, IBM Corporation released a new operating system called AIX which is compatible at the application interface level with AT&T's UNIX Operating System, Version 5.2, and includes extensions to the UNIX Operating System, Version 5.2. For a further description of the AIX Operating System, the reader is referred to "AIX Operating System Technical Reference," published by IBM Corporation, 2nd Edition (September 1986).

The invention disclosed and claimed herein specifically concerns providing a mechanism for auditing information which must be selectively kept and protected in a secure, distributed data processing system so that actions affecting that security can be traced to the responsible user. This mechanism is to be a part of a multi-user operating system such as UNIX, XENIX or AIX, so that a secure computer system can be established. The specific embodiment of the invention disclosed herein is applied to the AIX Operating System. The reader is directed to the description provided in the copending U.S. Pat. No. 4,918,653 by Abhai Johri, et al. entitled "A Trusted Path Mechanism for an Operating System," assigned to the IBM Corporation and which is incorporated herein by reference. The description in the Johri, et al. copending patent application includes the discussion of the operating principles for the AIX Operating System will assist the reader in understanding the invention disclosed and claimed herein. For further information on the AIX Operating System, the reader is further referred to the above cited IBM publication "AIX Operating System Technical Reference."

Since the AIX Operating System and other UNIX-like operating systems make use of a specialized set of terms, the following definitions are offered for some of those terms.

Process: A sequence of actions required to produce a desired result, such as an activity within the system begun by entering a command, running a shell program, or being started by another process.

Password: A string of characters that, when entered along with a user identification, allows an operator to sign on to the system.

Operating System: Software that controls the running of programs. In addition, an operating system may provide services such as resource allocation, scheduling, input/output control, and data management.

Kernel: In UNIX-like operating systems, the kernel implements the system call interface.

Init: After the kernel completes the basic process of initialization, it starts a process that is the ancestor of all other processes in the system, called the init process. The init process is a program that controls the state in which the system is running, normally either maintenance mode or multi-user mode.

Getty: The init process runs the getty command for each port to the system. Its primary function is to set the characteristics of the port specified.

Login: The login program logs the user onto the system, validates the user's password, makes the appropriate log entries, sets up the processing environment, and runs the command interpreter that is specified in the password file, usually the shell (SH) program.

Shell (SH): The shell command is a system command interpreter and programming language. It is an ordinary user program that reads commands entered at the keyboard and arrange for their execution.

Fork: The fork system call creates a new process called a child process, which is an exact copy of the calling process (the parent process). The created child process inherits most of the attributes of the parent process.

Exec: The exec system call executes a new program in the calling process. Exec does not create a new program, but it overlays the current program with a new one, which is called the new process image. The new process image file can be an executable binary file, an executable text file that contains a shell procedure, or a file which names an executable binary file or a shell procedure which is to be run.

Signal: Signals provide communication to an active process, forcing a single set of events where the current process environment is saved and a new one is generated. A signal is an event which interrupts the normal execution of a process and can specify a signal handler subroutine which can be called when a signal occurs.

Superuser (su): The user who can operate without the restrictions designed to prevent data loss or damage to the system (user ID 0).

Root: Another name sometimes used for superuser.

Root Directory: The top level of a tree-structured directory system.

Daemon Process: A process begun by the kernel or the root shell that can be stopped only by the superuser. Daemon processes generally provide services that must be available at all times such as sending data to a printer.

Mount: To make a file system accessible.

Terminal: An input/output device containing a keyboard and either a display device or a printer. Terminals usually are connected to a computer and allow a person to interact with the computer.

An example of a distributed network within which the invention can find application is described in the copending U.S. patent application by G. H. Neuman, et al., Ser. No. 14,897, filed Feb. 13, 1987, entitled "A System and Method for Accessing Remote Files in a Distributed Networking Environment," now U.S. Pat. No. 4,887,204 which is assigned to the IBM Corporation and which is incorporated herein by reference.

As described in the copending Neuman, et al. application, in a distributed environment, several data processing systems are interconnected across a network system. A distributed services program installed on the systems in the network allows the processors to access data files distributed across the various nodes of the network without regard to the location of the data file in the network.

To reduce the network traffic overhead when files at other nodes are accessed, and to preserve the file system semantics, i.e. the file integrity, Neuman, et al. disclose that the accessing of the various files are managed by file synchronization modes. A file is given a first synchronization mode if a file is open at only one node for either read or write access. A file is given a second synchronization mode if a file is opened for read only access at any node. A file is given a third synchronization mode if the file is open for read access in more than one node, and at least one node has the file open for write access.

If a file is in either the first or second synchronization mode, Neuman, et al. disclose that the client node, which is the node accessing the file, uses a client cache within its operating system to store the file. All read and writes are then sent to this cache.

If a file is in the third mode, Neuman, et al. disclose that all read and write requests must go to the server node where the file resides. The node accessing the file does not use the cache in its operating system to access the file data during this third mode.

Neuman, et al. disclose that the client cache is managed such that all read and write requests access the client cache in the first and second synchronization modes. In the third synchronization mode, the client cache is not used. In this way, overall system performance is improved without sacrificing file integrity.

OBJECTS OF THE INVENTION

It is therefore an object of the invention to provide an improved secure computer system.

It is another object of the invention to provide an improved secure computer system which complies with the DoD Standard.

It is yet a further object of the invention to provide an improved secure distributed data processing system in which audit information can be selectively kept and protected so that actions affecting the security of the system can be traced to the responsible user.

It is yet a further object of the invention to provide an improved secure, distributed data processing system using a UNIX-type operating system, in which audit information can be selectively kept and protected so that actions affecting security of the system can be traced to the responsible user

SUMMARY OF THE INVENTION

These and other objects, features and advantages of the invention are accomplished by the distributed auditing subsystem disclosed herein. The distributed auditing subsystem invention runs in a UNIX-like operating system environment with a hierarchical file system. The invention includes an audit daemon which provides an audit trail of accesses to the objects it protects and maintains and protects that audit trail from modification or unauthorized access or destruction. The audit data generated by the invention is protected so that read access to it is limited to those who are authorized for audit data. The invention enables the recording of events which are relevant to the maintenance of the security of the system, such as the use of identification and authentication mechanisms, the introduction of objects into a user's address space, the deletion of such objects, actions taken by computer operators and system administrators and/or system security officers, and other security relevant events. The invention generates an audit record for each recorded event which includes the date and time of the event, the user, the type of event, and the success or failure of the event. The invention performs an on-line compression of the audit trail log file using a UNIX-type daemon process. The audit daemon process has a restartable feature that enables it to recover after node failures. The invention finds particular application in a distributed processing system in which files may be variously stored at diverse storage locations in the network. In such a distributed system, the audit process of the invention can be carried out on a network-wide, distributed basis so that audit files located at diverse storage locations can be concentrated into a single audit trail log file.

In this manner, a secure computer system which conforms to the DoD Standard is achieved, which can generate, manipulate and data compress audit information concerning actions affecting the security of the distributed data processing system.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

An auditing subsystem for a unitary data processor which includes the feature of compressing the audit trail file has been previously disclosed in a paper by J. Picciotto entitled "The Design of an Effective Auditing Subsystem," *Proceedings of the* 1987 *IEEE Symposium on Security and Privacy,* Oakland, CA, pp. 13-22 (April 1987). Picciotto talks about how to design an auditing subsystem which contains compression. However, Picciotto fails to deal with how to get an auditing subsystem to operate in a distributed processing network where there are distributed services.

Figure 1:
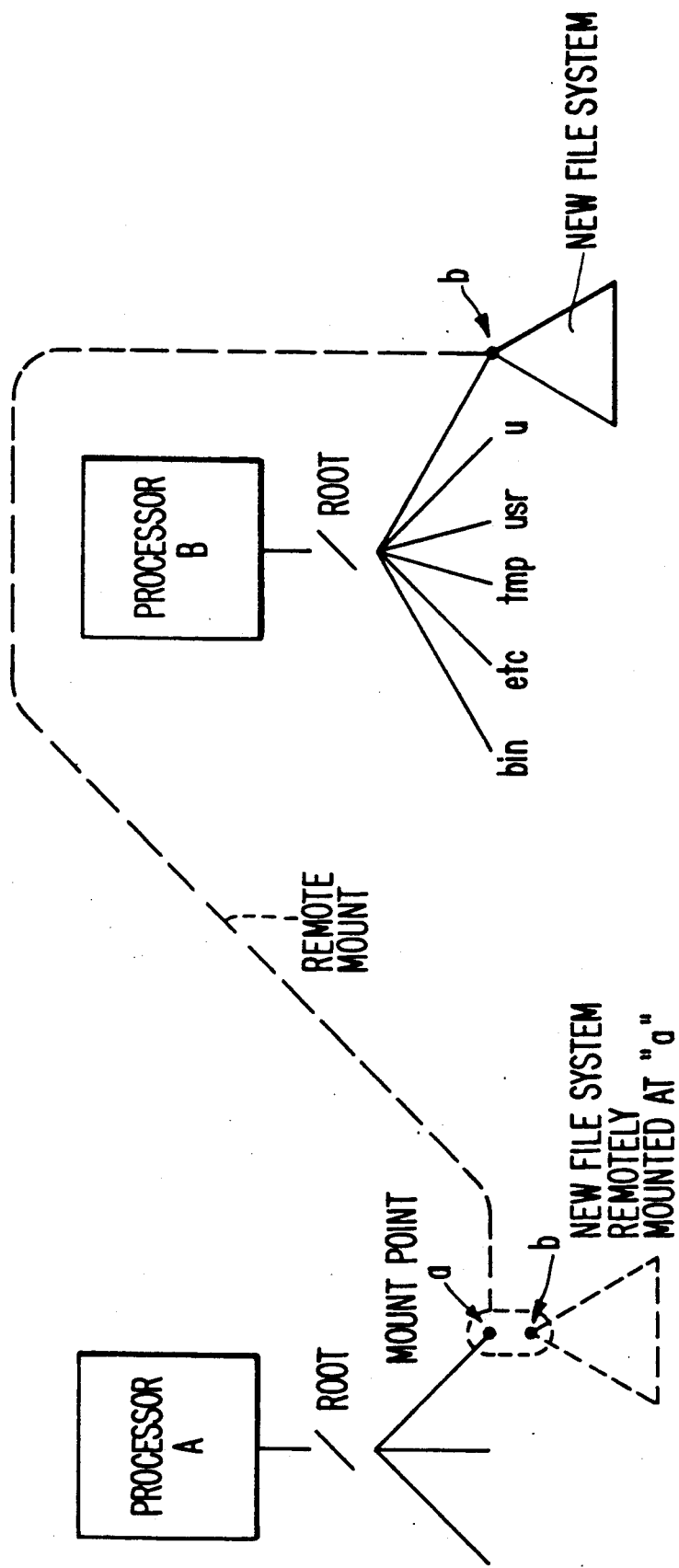
FIG. 1 is a diagram of a network within which includes two hierarchical file systems.

The concept of distributed services is described in the copending G. H. Neuman, et al. application referenced above, for example, as a collection of UNIX machines (nodes). Each node has a hierarchical file system that can be drawn as a tree, as shown in FIG. 1. The root of the tree is called slash and under each slash is a directory and in each directory we can have either other directories or files. We can think of a UNIX directory as like a file drawer. A UNIX file is like a file in that file drawer. In UNIX, we can have subdirectories of a directory; that is a path directory can have child directories. FIG. 1 shows a tree which has its root at the top and branches going down representing hierarchical name space where we have the root at the top represented by slash and under that we have some subdirectories. In UNIX some of the typical subdirectories are /bin, /etc, /temp and /usr and sometimes /u and then under a directory such as /etc, we have files, for example, /etc/rc or we could have a directory.

In accordance with the invention, we have introduced a new directory /etc/security. Under that, we have some tables. One of the tables under /etc/security is a file named /etc/security/s_cmd, which is the name of the file that contains the command table for the trusted shell, as described in the copending A. Johri, et al. application referenced above. Also under the directory name /etc/security, we have introduced a directory named /etc/security/audit and under this directory we have a file named a_event. In accordance with the invention, the event table lists the known events in the system for this particular auditing subsystem. Table 1 gives an example of an event table. There are two types of events: there are base events and there are administrative events. Base events are events that happen in kernel or that happen in commands. An example of a base event would be an event in the kernel such as the event named exec or the event named fork. An example of a base event in a command would be that there are two events in the command named login. One is login_fail and the other is login_ok. If we wanted to define an administrative event in the system that was either login_fail or login_ok and we wanted to name this administrative event login, then what we would do is go into the event table, /etc/security/audit/an_event, and edit the table to add a line that says login:-login_fail,login_ok. Then if we are an auditor and we want to turn on the audit event named "login," then it is already defined in the table. Administrative events are convenient macros that an auditor can use to edit this file or customize this file so that it contains new administrative events. The invention is especially designed for operation over distributed services (DS), in a distributed processing network.

In order to understand what DS does, as described in the G. H. Neuman, et al. copending application referenced above, some discussion is given here of hierarchical UNIX file systems. Suppose we have a network of UNIX systems and on each UNIX system, we have a hierarchical name space with directories and files; that is, it is a tree with a root at the top represented by "/" and underneath the "/" we have directories and files, as shown in FIG. 1. On the UNIX system we have some well-known directories under "/" called bin, etc, temp, usr and some others and then under those we have some other directories or some other files. Furthermore, it is the case that on a traditional UNIX system when we look at the name space, all of those directories and all of those files are local to that unitary data processor. None of the files are remote.

Let us assume that we have two UNIX systems. We can call the first one A and the second one B. Each UNIX system has a hierarchical name space having a tree with the "/" and the various files under it. What we would like to do is be on one machine A and to access files and directories on the other machine B. One way to do that, in fact the old way to do that, and that could still exist, is if we are on A and if we want to talk to B, what we do is we can log into B with a command called "telnet" or a command named "rlogin" (r for remote) and what we have actually done is first log into A and now we want to talk to B. So we either do a telnet or rlogin to B and now we are in B's environment (B's hierarchical name space) and we can perform operations on B. But the one thing we cannot do is move files back and forth between A and B. That is, we are either on A or on B, but we cannot be on both.

What we would like to do is be on one machine and while remaining in the first machine, get access to the other machine's hierarchical name space, either to its directories or its files. In fact, what we would like to do on A is have any command that works on A's local files, also work on any remote files on B. To do this, we need a way of naming a remote file. There are some other things we can do with existing code. One of the things we can do is if we are on A and we want to copy a file from A to B or from B to A, then there is a command for doing this and the command is called FTP for file transfer program. On AIX, it is called XFTP. The way that works is that we are on one machine and we say XFTP and it is basically like a login. We log into the other machine and now we can copy files back and forth and we can change the directory to a different directory. We can do a list (LST) to see what is in that directory and this was acceptable for a while, but it is rather cumbersome.

What we would really like to do if we are on A, is to copy a file from B. There is an existing command named CP for copy and what we do with copy is we say "CP X Y" where X and Y are the names of files. X is the name of an existing file and Y is the name of a brand new to-be-created file. What we have done effectively is, we made a copy of X and we have called it Y. Traditionally, X and Y are both local. They are files on the same machine, but what we would like, is for the software to be oblivious to whether or not X and Y are local or remote, either both are local or both are remote, a different one being local. There are more than four combinations, because if both files are remote, they do not have to be both on machine B. X can be on machine B and Y can be on machine C. When we make a copy of the file, with CP, we are using the same command that we previously used on the local machine to copy files that are non-local or remote. The question is, is there a simple way of doing this, or logging into A and working in A's hierarchical's name space and getting access to the hierarchical name space of other machines on the network like B and C, such that when we run commands that used to work only locally on A like copy CP, the system is now oblivious to whether or not the files they deal with are local or remote on B or C. In particular, we do not have to use XFTP or FTP to move files back and forth explicitly, we do not have to use telnet or rlogin to actually log into a different system to move files and do things. Sitting on the local machine, we have LAN transparent access to remote files. LAN is a local area network. Transparent means that we are oblivious or the code is oblivious to whether or not the files are local or remote. Access means we can read and write these files.

This is in effect what DS offers, as described in the Neuman, et al. application. On a local UNIX system, what happens is that we have a hard disk and we define in UNIX what is called file systems. A file system corresponds to the space of an entire hard disk, or it corresponds to part of the space on a hard disk. For example if we have 170 megabyte hard disk, like in an RT, we can divide one UNIX file system for that or we could chop that into two UNIX file systems, or three or four. There are some limits to the number of file systems we can have on a hard disk. Let us assume for the time being that we might have two file systems on 170 megabyte hard disk. What happens in UNIX is that "root" is not only a directory, it turns out also to be a file system. There is a certain amount of space on disk and it also contains the subdirectories, the directories and files that are in that file system. If we have two file systems in UNIX, we have one hierarchical name space. What we do is that we want to represent all of the file systems in one hierarchical name space and typically we define a directory in the name space and that will be a "mount point" a. We are going to "mount" another file system on top of that mount point a. In this particular example, mount point a happens to be a subdirectory of the root. In FIG. 1 the new file system on B is shown as a triangle with a dot b at the top. DS enables the mount point a on system A and the point b on the new file of system B to logically coincide. There are actually two directories under A. There is the directory in the root file system "/" of A and there is the subdirectory a at the mount point. The directory at b in system B that is the root of the mounted file system that is the file we are going to mount on top of the mount point a. Once we have done the mount operation, that is we have mounted a file system onto an existing directory, we have basically grown the hierarchical name space in system A to include more files and more directories. When we progress down the path in system A from "/" to mount point "a" and into the mounted directory at "b", by doing a change directory command CD, we enter into an expanded area.

The reason why we bother chopping things into file systems on UNIX, is file rolling. We do not want to put all data on one disk in one file system. We want to chop things up into smaller file systems such that if we have a lot of activity in one, but do not have a lot of activity in another, then the one for which we do not have a lot of activity, we do not have to back it up very often. The one that we have a lot of activity in, we want to back up quite a bit. Rather than always backing up everything, we partition the disk space in the file system such that it is easier to make backups of some files, or if we have a failure in part of the disk, we do not lose everything, we just lose that file system. When we back up storage on UNIX, we back it up on a profile system basis. What we have here is one UNIX machine, we have one or more disks on it, each disk contains one or more UNIX file systems. If the UNIX system has more than one disk, then each of the disks has one or more file systems and what we do is we have a distinguished file system called the root file system and the other file systems are subtrees that we mount onto various directories of this root file system. This is a way of extending a hierarchical name space for a local machine.

Much of UNIX depends on having this single hierarchical name space and for most of the commands used when we edit a file or when we copy a file, we specify a path name and the path name is either an absolute path name, or a relative path name. An absolute path name begins with "/" and it starts at the root of this hierarchical tree. In a relative path name, there is a command for changing a directory, like opening a file drawer. When we do a CD to change directory to go into a different place, then we can specify path names relative to that directory. This completes the background discussion of hierarchical UNIX file systems necessary to introduce the principles of distributed services.

In FIG. 1, let us name the systems A and B and let us name the directory on A that we are interested in as "a" and the directory on B that we are interested in as "b." With distributed services as described by Neuman, et al. in their referenced copending application, on A, we can mount the directory and everything below it from machine "b" onto the directory "a" on machine A. Another way of doing this, is if we go to machine B, and we look at the directory named "b," and we view it as having a triangle under "b," and let us view that triangle not as a file system, but view that triangle as all of the directories and files that are underneath "b." What we are effectively doing, is we are taking a scissors and we are cutting above "b" and we are moving it over and putting it right on top of "a." Another way of doing this, is to draw a dotted line from "a" to "b" and to put an arrowhead on the dotted line near "b." This means that if we are on machine A, and we want to access a file on machine B and we progress down the path in machine A that has the remote directory mounted onto "a," then whenever we progress to "a," DS automatically goes over the dotted line of FIG. 1 and accesses files and directories under "b." This is "mounting" a remote directory onto a local directory. What DS allows, is mounting a remote directory onto a local directory or to mount a remote file onto a local file. Parenthetically, DS also allows mounting any local directory onto another local directory or any local file onto any other local file.

If we have done the remote mount, and we use the CP copy command to copy a local file to, for example /temp/x (a temporary file named x in the temporary directory) and we want to copy that to /b/x, then after we have done the remote mount, we are copying a local file to a remote file and we have done so because we have already performed the remote mount. That is what distributed services is all about, remote mounts. Or another way of referring to them is virtual mounts. Virtual means that we are not really doing the mount, it is as though we were doing the mount. In that case, we are not really mounting a file system, we are really mounting a directory or a file which can be remote.

Figure 2:
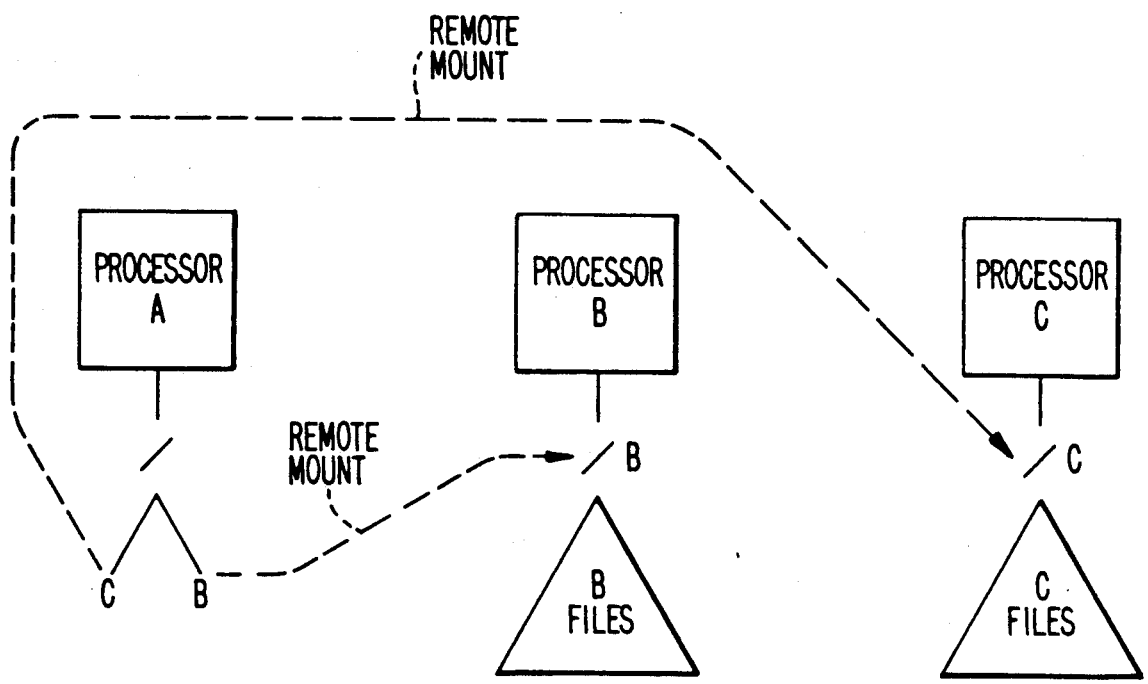
FIG. 2 is a diagram similar to FIG. 1, showing how directories on systems B and C can be remotely mounted on system A.

Let us say that we are on machine A in FIG. 2 and we want to access all the files at machine B. We have three machines A, B and C and on A, normally we can only access the A files and on B, we can only access the B files, and similarly, when we are on C, we can only access the C files. Suppose we are on A and we want to access all B files. One way to do that is to create a subdirectory of the root of A and call it B and therefore have a directory on machine A called B, that is the name of the directory of the other machine. What we do is mount the root of B onto A's directory /B. In FIG. 2 mounting /B onto A is represented by a dash line from /B, over to the root of B, with an arrowhead next to the root of B. The triangle at /B is the hierarchical name space of B. The result of remote mount "rmount" or "vmount," let us call it, is if we are on A, and we want to mention any file name over on B, we just prefix it with /B. Similarly, if we are on A, and we want to mention any file name on system C, then we create a subdirectory of the root of A called C, and then do a "vmount" (virtual mount) of C's root onto A's directory named /C. This is shown in FIG. 2 by a dash line from /C over to the root of C. If we are on any machine, for example A, we can specify a name of any file in any other machine with the remote mount feature of DS. This is one way we can use the DS mechanism. Once we have done that, we now have a way to access all files. It turns out this is one way to use DS, but there are other useful features.

Figure 3:
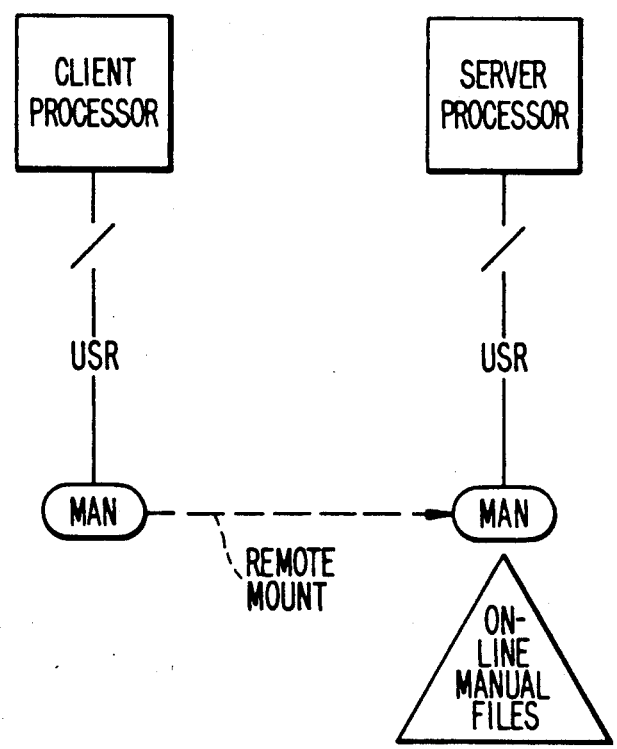
FIG. 3 is a diagram similar to FIG. 1, showing how a client system can access a file on a server system.

On UNIX, there is an on-line manual that is typically in a file named /usr/man and under that, there is normally a big directory of things. If we want to bring up a manual page for any particular command on the screen, we use a command name "man" for manual and we write the name of that command. For example, if the command that we are interested in is the command named CP for copy, and we want to see the manual page on the machine for CP, then we write "man CP" and up on the screen is printed a picture of the manual page for CP. The on-line manual happens to be stored in /usr/man and it might be five to 10 megabytes of material and we might have a local area network where we have some machines that have small disks and other machines that have many disks. The machine that has many disks, we might call a file server. The other machines may not have as much disk space and we would like to store the on-line manual in only one place, namely on the file server and not on all of the machines. There is no need to store the on-line manual in every single system. We only need to store it in one place. On our file server machine, we put the on-line manual under /usr/man. The machine which stores the on-line manual is called the server and the machine that does not have an on-line manual is called a client. As shown in FIG. 3, on the client machine, there is a hierarchical name space that starts with a root which is a slash and under that, there is a subdirectory called "usr" and under "usr" there is a subdirectory called "man" and under "man" there is nothing. "Man" is a directory on the client machine, but there is nothing under it. The way we get access to the real manual is we do a "vmount" or "rmount" of the directory containing the manual from the server over to the client. The command "vmount" will specify the two path names. FIG. 3 shows that on the client, a dash line is drawn from the stub directory /usr/man. On the server machine we have the same path, /usr/man, but we further have the manual (represented as a triangle) under /usr/man. The "vmount" is represented by a dash line from the client "man" over to the server "man." Suppose we are on the client machine and we run the command whose name also happens to be "man" and we say "man CP;" what happens is since the actual manual pages are remote and not local, DS has the ability to go over and access those files from the server and get them as though they were local. What we have is transparent access to remote files.

The above discussion shows two different ways of using DS. Namely the user can have a file named to any file in any hierarchical name space on any machine in his LAN. Alternately, the user can customize his name space so that files he does not have space for, can be remotely stored and just a pointer will remotely access it. This is particularly useful for something like an on-line manual. It is also useful if we are doing software development or if we have many people sharing a common data base such as in a local area network and each person does not have to store everything on the same local machine. We have transparent access to it as though it were local. This completes the brief description of distributed services. The following description now focuses on the invention.

The invention is performing auditing and audit trail compression on a network-wide basis which is compatible with DS. In the DS environment, the audit trail can be local or remote. It can operate in a LAN where we have many machines, and there can be more than one machine appending audit trail records to the same audit trail file. There may be many machines adding audit trail records to the same file. In such an auditing system, the audit trail records tend to accumulate very quickly and fill up audit disk space. If we have just a small work station with not much disk space, although we can define the audit trail file there, it will fill up after a while and we have to manage it on a daily or a weekly basis. What we would prefer to do, is to have one machine in the network that we may designate as an audit trail server. The server machine will have a large disk space on it. For example, high capacity video disks can be used on the server, which can hold 500 megabytes. We would designate one of these as an audit trail server and have all of the client nodes of the network feed audit trail data to the server. One of the properties of a video disk is that it is a write-once media. That is, we want to be able to write once onto the disk, but we cannot rewrite. We keep appending new data to the file and that is consistent with its use for example in auditing as an audit trail file.

Some of the invention's features include file location transparency. Any file names or directory names that are to be audited can either be local or remote. Furthermore, the invention can accommodate many nodes appending audit records to one audit trail file. Furthermore, when doing compression in an auditing scheme, the invention compresses the records before they are put onto the audit trail file. Rather than compressing one record at a time, the invention fills up small record bins. Each bin has a certain maximum number of bytes, for example 20,000 bytes in the disclosed embodiment. When we fill up a bin, we do the compression on the whole bin and then we append the compressed bin to the audit trail file. What the audit trail consists of in the invention is a sequence of compressed bins. The compression technique that we are using is a command named PACK that is available on the UNIX Operating System. The auditing subsystem invention satisfies the Audit Requirement for classes C2 to A1 in the DoD Orange Book. The invention performs on-line compression of the audit trail log file using a single audit daemon process per system.

Figure 4:
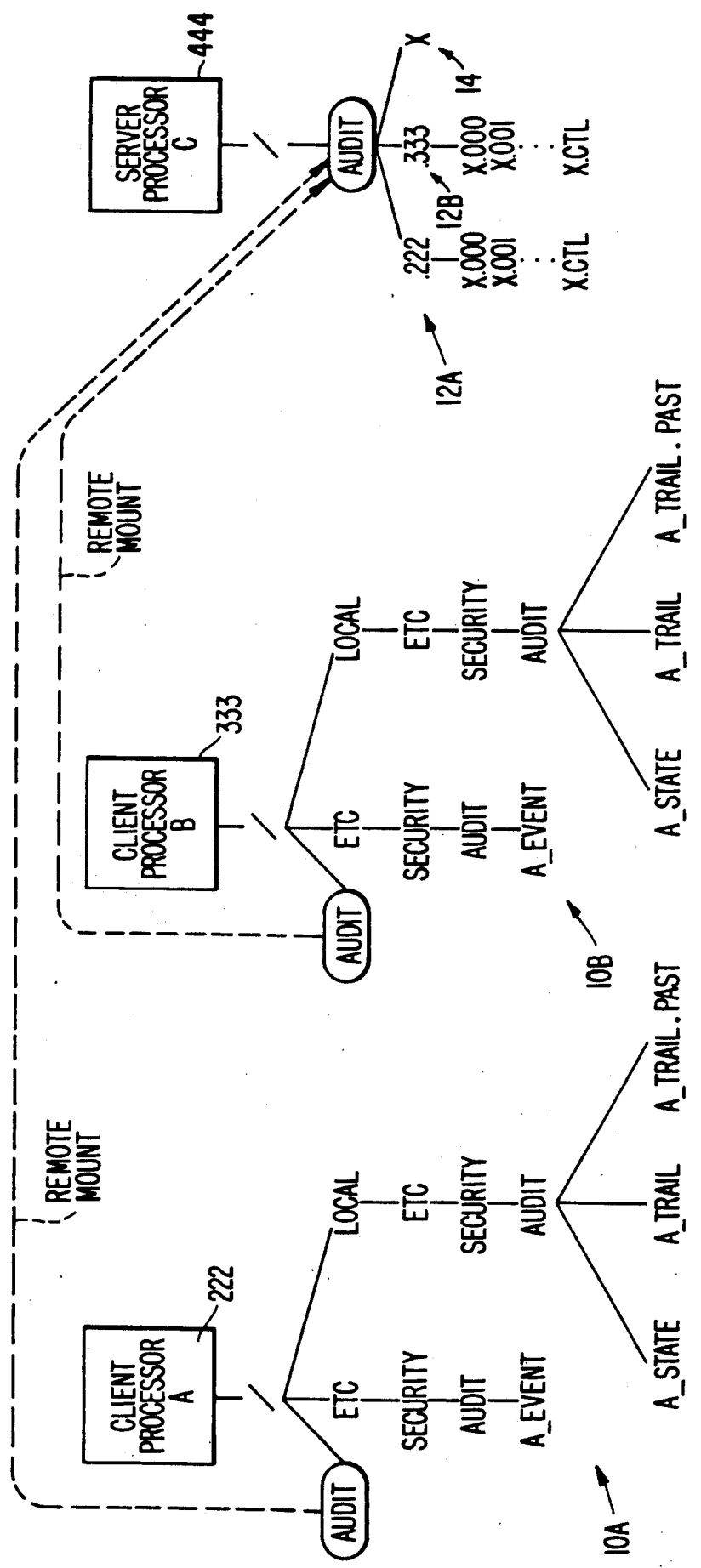
FIG. 4 depicts how audit trail information is generated and compressed from a plurality of nodes in the distributed processing system.

The following is an example of how the auditing invention works and the example has three nodes as shown in FIG. 4. A node is a machine and the nodes are named A, B and C. They are shown from left to right in FIG. 4. Let us assume that associated with each node named A, B and C is a node ID (a nid). A nid for A is a number, in this example, let us make it 222. The nid for B in this example is 333 and the nid for C is 444. For the IBM RT PC, for example the nids are 32-bit integers. FIG. 4 shows the hierarchical name space of the file system name space on A. We are only interested in four files on A, but they happen to have long path names. The first file that we are interested in A is actually the name of A's event table. A's event table happens to be /etc/security/audit/a_event. Each machine has its own event table, because on that machine we would want to be able to specify per-machine events if desired. Another possibility is that we could have all machines use the same set of events and what we would do is designate one machine as the machine that contains either the audit server or file server which stores the real event table and just vmount that event table onto each client machine.

There is another set of path names on a local machine which we may not want to have accessed by other machines. These files are local only. That is, when we refer to these files, we want to make sure that either they are stored on a local machine or if they are stored remotely that this is A's copy of these files. The user at machine A may not want any other machine (B or C) to be able to get to certain local files. One place to put them is in a directory on A called /local. The word "local" here means that there is a node-specific copy of these files for A. Similarly, on machine B, the user may have a /local directory and the files under there are to be node.specific to B.

Under A/local, we have /local/etc/security/audit. Audit here is a directory and under /audit we have three files. A_state is the first file, and it just contains the set of events that are turned on. The second file under this audit is A_trail and it contains the name of the current audit trail and it also contains the name of the timestamp when auditing was turned on for the other trail. The third file is A_trail.past and that contains the history of audit trail files for node A and the corresponding start and stop timestamps. There can also be be some other information in there.

Similarly on node B, we have the same kind of directory structure. It has an event table under /etc/security/audit/a_event and it has the three files. The node-specific files under /local/etc/security/event/audit. The state file, the trail file and the trail.past file.

In this example we turn on auditing at machines A and B and place the audit trail file on machine C. For this example, there are no audit records from machine C, but if desired, we could turn on auditing on machine C and specify the same audit trail file. Let us assume that we have a hierarchical name space on C where slash is the root and under that we have a directory named audit, and under that we are going to have a file named X and that file named X is going to be the name of the audit trail file. What we would do is turn on auditing on A and specify that the audit trail file is going to be the file on C named /audit/X and similarly when we turn on auditing on machine B, we specify that the audit trail file is going to be the file on machine C named /audit/X and if we turned on auditing on C, we could specify that the audit trail file is /audit/X. The way we do this is as follows.

On machine A, we define a subdirectory of the root named audit. Similarly, on B we define a subdirectory of the root named audit. What we do is vmount the directory on machine C named /audit onto each of those local directory stubs on A and B. In FIG. 4 on A, we have /audit; there is a dash line from that audit on A over to the slash audit on C. Similarly on machine B, if we do a vmount of C/audit o the B/audit there is a dash line from B over to C with the arrowhead on the audit under C. What is happening is that on machine A, /audit is a remote directory. In the invention, the audit trail can be either local or remote. The audit trail in this example is /audit/X. It does not matter if that file is remote or if the directory containing that file is remote.

Figure 5:
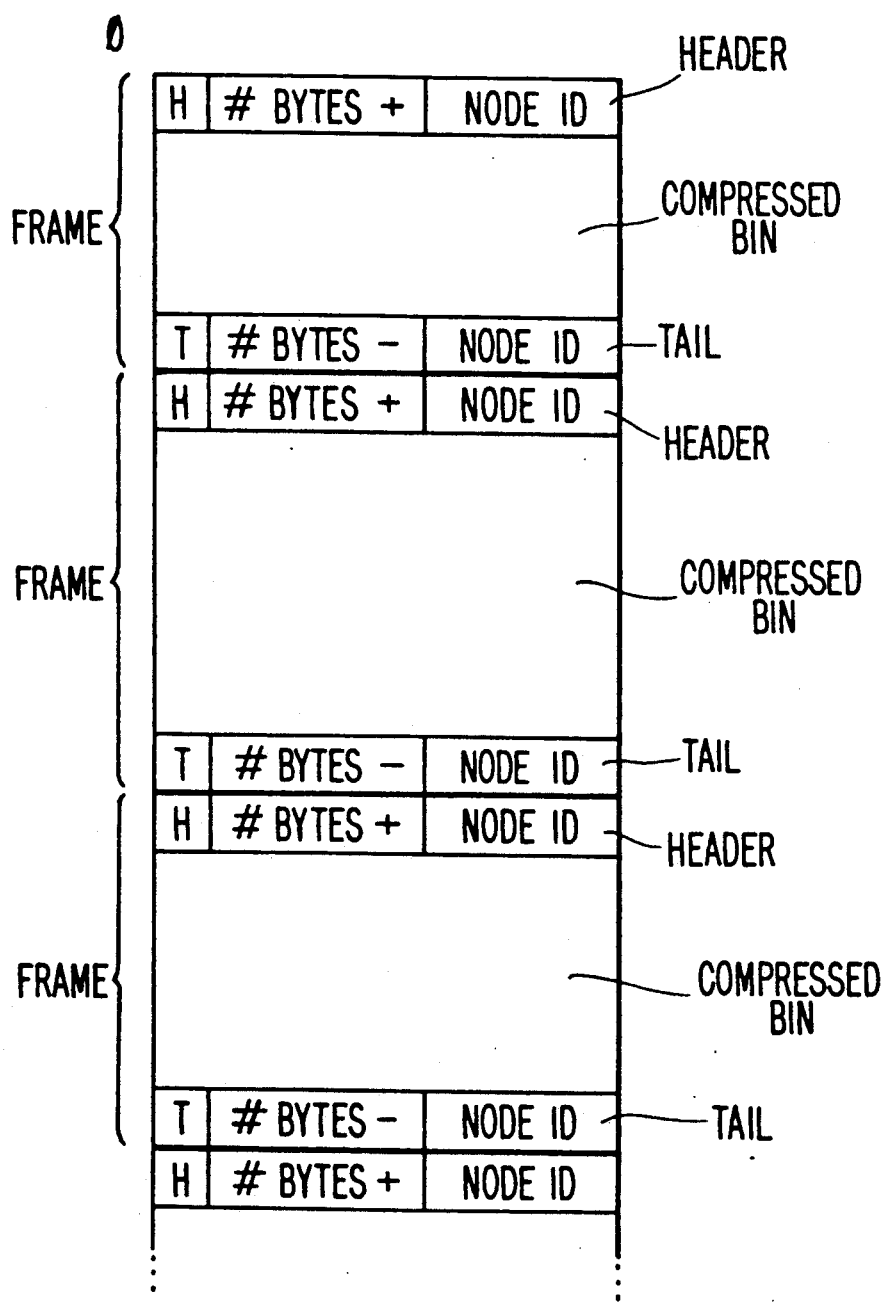
FIG. 5 shows the structure of the real audit trail file.

The invention compresses the audit trail records. We write the audit trail records into bins. When the bins fill up or get close to full, we move on to another bin and we start filling it next. We have to have a name for these bins. These bins are files in the hierarchical name space, so we have to select a location for them. Another thing we have to do is that on each machine A, B and C, there is another process running called the audit daemon and it is the audit daemon that actually compresses the bins and appends the compressed bins to the audit trail file. The audit trail file is shown in FIG. 5 as a long column divided into frames by horizontal lines, the line at the top indicating that it is the byte 0 file. Each of these frames will contain a compressed bin. The audit daemon does not compress one record at a time, but it takes a whole bin of records, compresses the bin and appends the compressed bin of audit records to this audit trail file. Each frame in the audit trail file includes in addition to the compressed bin, a small header and a small trailer. The small header has a uniform format and the small trailer has the same size and another uniform format. The bin header tells how many bytes are in the compressed bin and the nid where that bin came from.

The headers on the frames are in the clear (not compressed) so that if we want to scan forward through the audit trail, looking for records from a particular node or nid, we just look at the current header at the beginning of the file, and either its a compressed bin of records from the node that we are interested in or it is not. If it is, then we do whatever we need to do in reading its contents. If it is not the node of interest, then we know exactly how many bytes to skip to go to the next compressed bin and the next compressed bin will have a similar header.

The reason why we have a trailer on each of these bins is because it is useful to read the audit file backwards. The reason why we want to read this file backwards is during recovery time. If we have been auditing and one of the machines fails, or the machine containing the audit trail fails, then when we eventually reboot the machine or we get it running again, the daemons that are doing the compression have to determine what state they are in and resume operation. In order to do that, they have to determine what bin they finished with, and what bin to pick up next. Part of that information they determine from reading the audit trail file backwards.

In FIG. 4, we have machine A with hierarchical name space under it to the files that we are interested in. The same for B, the same for C. Under C, we have something slightly different. A and B are similar but C is different. Remember that the nid for A was 222 and the nid for B was 333. Here is what we do on machine C. If we specify that the audit trail is /audit/X, then X is going to be the real audit trail file and it is the file that is eventually going to contain the sequence of compressed bins. Each bin can potentially be from a different node and when we append these bins onto the audit trail file, we can do so in an atomic way on UNIX. That is, when we do the write, if we have two processes that one or two audit daemons will want to write at the same time, there is no conflict because on UNIX these writes will be serialized. So one bin will come in first and the other will come in next.

But the problem remains as to what to name the bins so that if we have two or more machines doing auditing operations, they do not write on each other's bin files. In accordance with the invention, we segregate the bin files on a per node basis and one place to segregate them is under /audit. Instead of just creating simple files under /audit, we create a directory of temporary bin files under /audit, we give it as a name, for example, the nid corresponding to the node that is creating these bin files, for example node A, and we place the bin files under the subdirectory of /audit, corresponding to machine A. On machine C, we have a directory called /audit/222 or /audit/.222 because there is less of a probability of a file name with a dot being a name conflict. Under /audit/.222, we have the temporary bin files for machine A. Similarly, for machine B, which has nid 333 on machine C, we have a directory named /audit/.333 and under there we put the temporary bin files for machine B. We can name the bin files with a common prefix and a suffix that goes serially counts through a sequence of numbers, for example 0 up to 999. In the present example, we use the trail file name, for example X, as a prefix of a temporary bin file name. As the suffix of a temporary bin file name we have dot followed by three decimal digits and the decimal digits will run from 000 to 999 and then they will wrap back to 000. There is also a small control file in each directory, in this example, x.ctl, for example /audit/.222/x.ctl (it is a control file for this set of bins). The control file gives information about what is the next bin to use. In general, there is no problem about wrapping bin file numbers from 999 back to 000 because we are assuming that audit daemon is on and that when an audit daemon compresses a bin, an audit daemon does not generally compress a bin until it is full and the system has gone into another bin. If the audit daemon has compressed a temporary bin file, the audit daemon writes the compressed bin to the real audit trail file named /audit/X and it then erases that bin from /audit/.222/X.123, for example. It goes through the bins serially. If there is no work for the audit daemon to do, the audit daemon goes to sleep. When the audit daemon compresses a bin, it appends the compressed bin to the real audit trail file, in this example, /audit/X. In this manner, while events are occurring which require auditing by the audit daemon, the uncompressed bins can be temporarily stored under /audit/.222, for example. Then later when no events are occurring, the audit daemon can compress the temporary bin files and write them to the real audit trail file /audit/X.

While bins are being stored on machine C, the audit daemon that is working on machine A's bins is really machine A's daemon. Machine A's daemon knows about a particular set of bins and it does not care if the bins are local or remote, it just does its work. In this example we have A's daemon working on bins stored under C's machine /audit/.222 and we have B's daemon working on bins that are stored on C's machine under /audit/.333. If we had auditing turned on for machine C, its daemon would be working out of bins under a subdirectory on machine C named /audit/.444. These daemons are working out of different places. Whenever a daemon wants to append a compressed bin onto the real audit trail file, it calls a system call in UNIX named "write" and it writes it in one atomic write. If there are two daemons that want to write to the real audit trail file at the same time, they are serialized. This concludes the example of a remote audit trail file to which two or maybe three systems are writing, in accordance with the invention.

Figure 7:
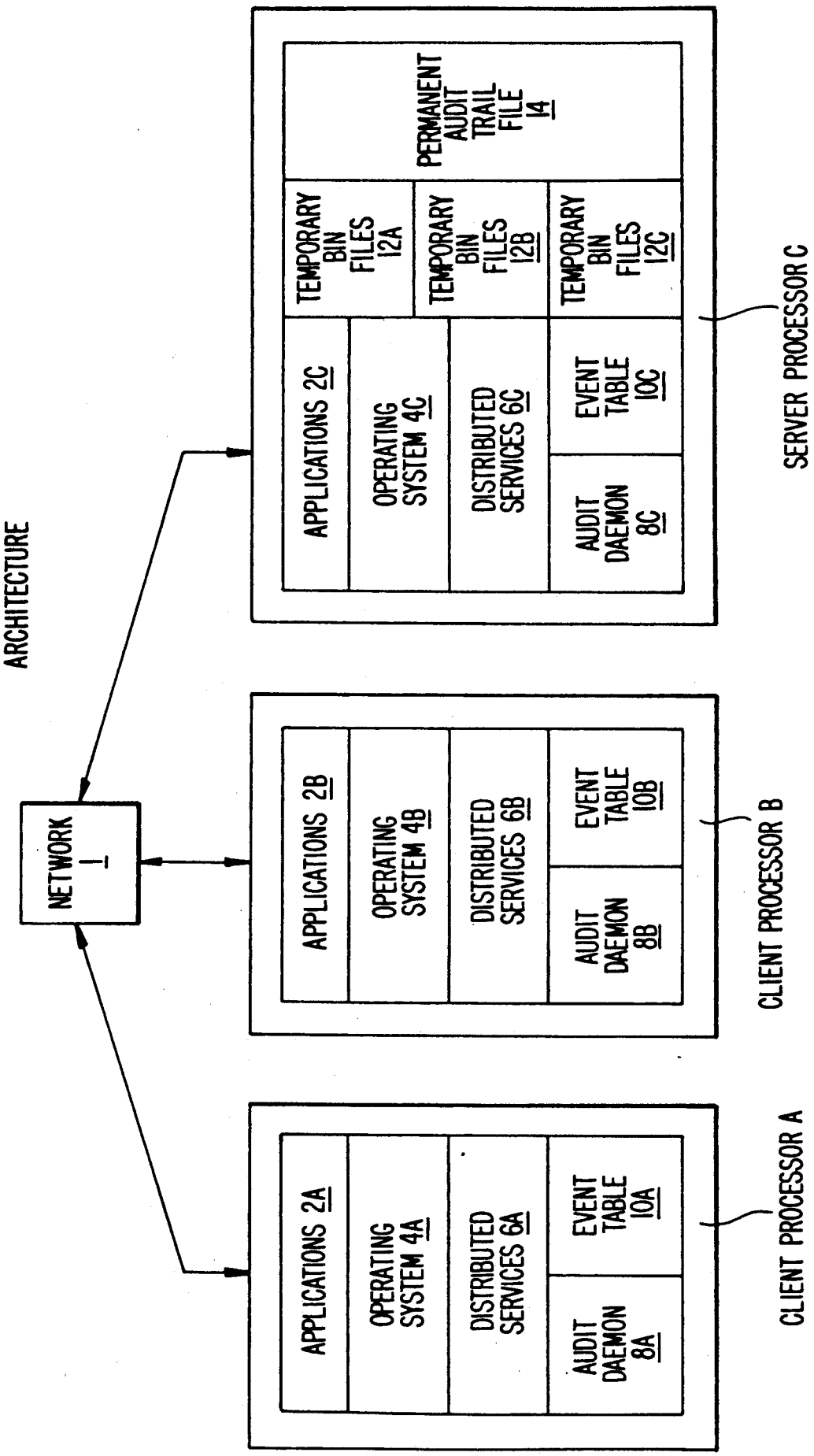
FIG. 7 is an architectural diagram of the invention.

FIG. 7 is an architectural diagram of the invention, showing the network 1 interconnecting the client processor A, the client processor B and the server processor C. As is see from FIG. 7, the client processor A has application programs 2A running under the operating system 4A which is, for example, a UNIX-like operating system. The distributed services 6A running in client processor A provide the system and method for accessing remote files in a distributed networking environment, as is described by Neuman, et al. in their above referenced copending patent application. The audit daemon 8A in the client processor A uses the events defined in the event table 10A to identify those operations being carried out in the client processor A which must be audited. The audit daemon 8A develops audit records which are stored in the temporary bin files 12A of the server processor C, through the agency of the distributed services 6A, as has been described. Similarly, the applications 2B, operating system 4B, distributed services 6B in the client processor B operate in a similar manner to the corresponding sections of the client processor A. The audit daemon 8B in the client processor B uses the events defined in the event table 10B to audit operations being carried on in the client processor B. Audit records developed by the audit daemon 8B are stored in the temporary bin files 12B of the server processor C, through the agency of the distributed services 6B, as previously described. The applications 2C, operating system 4C and distributed services 6C in the server processor C operate in a manner similar to that for the client processor A. The audit daemon 8C uses the events defined in the event table 10C to audit operations being carried out in the server processor C. The audit daemon 8C will store the audit records developed for the operations in the server processor C, in the temporary bin files 12C of the server processor C. As has been previously described, the audit daemon 8A and the client processor A, will periodically examine the contents of the temporary bin files 12A in the server processor C, to determine if there are any bins of audit records which have not been compressed. The audit daemon 8A will then go through its compression operation, selecting bins in the temporary bin files 12A which have not been compressed, compressing the contents of those bins, and then appending the compressed bins with the appropriate header and trailer, to the permanent or real audit trail file 14 in the server processor C, through the agency of the distributed services 6A, as has been previously described. In a similar manner, the audit daemon 8B in the client processor B will periodically examine the contents of the temporary bin files 12B in the server processor C, to determine whether there are bins of audit records from the client processor B which have not been compressed. Upon finding uncompressed bins in the temporary bin files 12B, the audit daemon 8B, through the agency of the distributed services 6B, will carry out its compression operation on selected bins in the temporary bin files 12B, and will then append the compressed bins along with the appropriate header and trailer portions, to the permanent or real audit trail file 14 in the server processor C. The audit daemon 8B does this through the agency of the distributed services 6B, as has been previously described. The audit daemon 8C, in a similar manner, can periodically review the contents of the temporary bin files 12C, to determine if there are uncompressed bins which should be compressed and then added to the permanent audit trail file 14 with the appropriate header and trailer portion.

DETAILED DESCRIPTION OF THE AIX EMBODIMENT OF THE INVENTION

The UNIX (UNIX is a trademark of AT&T Bell Laboratories) and AIX (AIX is a trademark of IBM Corporation) and UNIX-like operating systems need an auditing subsystem that satisfies the Audit Requirement for classes C2 to A1 of the DoD Trusted Computer System Evaluation Criteria (December, 1985), also called the "Orange Book." This auditing subsystem satisfies all the following design requirements and properties:

(a) Software environment requirements: runs in a UNIX (or AIX or UNIX-like) operating system environment with a hierarchical file system and with an atomic write operation like the write () system call, and runs in an operating system environment with local/remote file/directory location transparency, such as a "virtual mount" or "remote mount" based mechanism (e.g.,) IBM RT PC AIX Distributed Services, also known as DS);

(b) Security requirement: provides an auditing framework to help satisfy the Audit Requirement for classes C2 to A1 of the Orange Book;

(c) Invention properties: performs on-line compression of the audit trail log file using a single audit daemon process per system, has a restartable audit daemon that recovers after node failures, for DS or a similar mechanism, has file/directory location transparency, for DS or a similar mechanism, lets many nodes append audit records to one audit trail log file, and captures the login user ID, can prevent login as a pseudo-user like root, but can allow su ("substitute user") to a pseudo-user like root.

(d) Additional properties: lets the audit trail log file be on write-once media, and has no well-known file names in the operating system kernel part of the auditing subsystem, and cuts exactly one audit trail record per system call if the corresponding base event is enabled and exercised.

DESCRIPTION OF INVENTION

We explain this invention in the context of an implementation of it in the AIX Operating System. Although we explain the invention in the context of the AIX Operating System, but it also applies to any UNIX or UNIX-like operating

ARCHITECTURE OF THE AUDITING SUBSYSTEM

This section describes the architecture of the auditing subsystem. By "architecture" we mean the user and programmer interface to the outermost (i.e., AIX system) module. To define the architecture, we list and review the auditing subsystem "manual pages" from the *IBM RT PC AIX Operating System Commands Reference*, 2nd Edition 1986 and the *IBM RT PC AIX Operating System Technical Reference*, 1st Edition 1985, and we list the AIX auditing subsystem path names.

OVERVIEW

The following lists the AIX "manual page" names that define the architecture of the AIX auditing subsystem.
commands:
  audit: controls auditing subsystem
  auditd: perform compression on audit data
  auditpr: displays a "filtered" audit trail file
system calls:
  audit: enables and disables auditing
  auditevents: gets and sets the audit events of the system
  auditlog: appends an audit record to the audit trail file
  auditproc: gets and sets the audit state of a process
file formats:
  a_event: associates an administrative event with base events
  a_state: records general and special auditing events
  audit: describes the audit trail file format For convenient reference, the following lists path names in the AIX auditing subsystem.

| audit directories: | |
|---|---|
| /etc/security/audit | for system audit tables (not audit trail file itself) |
| /local | for node-specific files |
| audit tables: | |
| /etc/security/audit/a_event | Audit Event Table |
| /local/etc/security/audit/a_state | Audit State |
| /local/etc/security/audit/a_trail | Audit Trail Name |
| /local/etc/security/audit/a_trail.past | Audit Trail Name History |
| audit header files: | |
| /usr/include/sys/audit.h | definitions for auditing system calls |
| /usr/include/sys/auditd.h | definitions for audit daemon and kernel |
| /usr/include/sys/auditk.h | definitions for auditing in the kernel |
| /usr/include/sys/auditlog.h | definitions for audit log record |
| audit commands: | |
| /usr/bin/audit | controls auditing subsystem |
| /usr/bin/auditpr | formats audit trail file |
| audit daemon: | |
| /etc/auditd | Audit Daemon |

We now describe the auditing subsystem in terms from the above lists.

AUDIT COMMAND AND AUDIT TABLES

The audit command controls the auditing subsystem. It can be invoked only by the superuser. It can: enable auditing and specify the audit trail file, switch the audit trail file when auditing is already enabled, disable the entire auditing subsystem, specify what (administrative or base) events are audited for the general class and the special class of users, distinguish users or groups as in the general class or in the special class, query the status of the auditing subsystem, query the history of audit trail files, and clear the set of general events or special events or special users or special groups.

The purpose of specifying audit events and distinguishing two classes of users is to help prefilter (i.e., selective collection) the audit trail log file records, rather than flooding the audit trail log file with unnecessary records that must be postfiltered (i.e., selective reduction).

The audit command uses the following files:
  /etc/security/audit/a_event
  /etc/security/s_user
  /etc/security/s_group
  /local/etc/security/a_state
  /local/etc/security/a_trail
  /local/etc/security/a_trail.past Each entry in the event table /etc/security/audit/a_event associates an administrative event with a set of base events. An administrative event (e.g., "system_call" or "tcpip_event" or "object_create"), a convenient macro for an auditor, is defined by a set of "atomic" base events and/or previously defined administrative events. A base event is either a system call name (e.g., "fork") or an event in a trusted process (e.g., "login_ok") or a non-system-call event in the kernel (e.g., "dsrpc").

Each entry in the user table /etc/security/s_user (and in the group table /etc/security/s_group) contains a field that is 1 to identify special auditing and 0 to identify general auditing.

The audit state file /local/etc/security/audit/a_state holds the current sets of general and special events for an event status query.

In the invention, directory /local contains node-specific files. This directory, contrary to its name, can be remote ("vmounted" or "rmounted"). However, whether local or remote, its files must be node-specific. The name "local" means that you can think of these files as either local or logically local. In this design, directories /etc/security/audit or etc/security, or the files that they contain, can be local or remote.

The audit trail name file /local/etc/security/audit/a_trail and the audit trail name history file /local/etc/security/audit/a_trail.past contain audit trail file names and (start and stop) timestamps that are used by the status query and for recovery by the audit daemon.

To hold the audit trail files, we recommend that an entire file system be created and dedicated to hold trails, say /audit. If the audit trail file is remote, then with a mechanism like DS an audit server directory for the trail can be "vmounted" onto a local /audit stub directory.

AUDIT DAEMON AND AUDIT TRAIL FILE FORMAT

The audit daemon /etc/auditd is a background process (usually started from the /etc/rc command file) that packs (or compresses) bins of kernel-generated audit records and writes the packed bins to the audit trail file.

In the invention, the kernel does not write audit records directly into the audit trail file. Instead, the writing of audit records is buffered; the kernel writes audit records into a sequence of bins, each a user level file with a maximum size in the current design, and the audit daemon reads bin files, one at a time, and appends compressed bins to the audit trail file.

An audit trail file consists of a sequence of three-part (head, body, tail) frames, where the body consists of a possibly packed bin (i.e., sequence of audit records for a particular node), and where the head and tail have the following structure:

```
struct x
[
ushort id;      /* head=0×f0f0, tail=0×0f0f */
ushort bin;     /* bin # */
ushort before;  /* unpacked length of body */
ushort after;   /* packed (current) length of body */
nid_t nid;      /* node identifier */
];
```

Other than the id field, the head and tail of a frame are identical, which allows the audit trail to be scanned forwards or backwards. When (after==before), then the body is unpacked; otherwise (after<before) and the body is packed. For packing and unpacking, we use a Hoffman encoding algorithm like that used in command pack.

In the body, each unpacked audit record itself has a head and an optional tail. File /usr/include/sys/auditlog.h defines the head of an audit trail record with a C structure.

LOGIN USER ID

A significant feature of the invention is that it satisfies the per individual accountability property of the Audit Requirement in the Orange Book, say for class C2. For a C2 AIX, so configurable at system installation time, we disallow login as root or any other pseudo-user (e.g., bin), however, we do allow su (the "substitute user" command) to a pseudo-user like root. Also, the design remembers the login user ID of a process in the kernel with new component u_luid in the "u" block, and posts it on each audit record along with the other user IDs (i.e., real and effective) so that, with command auditpr, we can postselect audit trail records based on login user ID.

The login user ID is set at login time and it cannot be changed during a login session. It is not set directly by a system call. Instead, it is set as a side effect of system call setuid only when there is a call to setuid away from root for the first time during a login session, as is done by the login process.

A pseudo-user, or false user, is not a real person but a role; typically a group of real users know the password of a pseudo-user. The user name root is a pseudo-user.

On the AIX the user table /etc/security/s_user contains a "login" field that is 1 to allow login and 0 to disallow login on a per user basis. In a C2 AIX system, the "login" field value of each pseudo-user, including root, is 0 (for no login allowed). An administrator can set the "login" field with command adduser, since the administrator should be able to differentiate a real user from a pseudo-user.

Invalidating a user with the adduser command is not the same as disallowing that user to login. When a user has been invalidated, the password check fails for that user because the encrypted password has been replaced with a * and there is an explicit check for a *. As an invalidated user, you cannot login, and in addition you cannot su directly to an invalidated user. If the "login" field is 0 for a user, then that user cannot login, but you can su directly to that user. Of course, a system administrator with the root password can su to root then su to any user, including an invalidated one.

For example, as a system administrator, one would login as, for example, user matthew, then su to root to perform various administrative tasks on a C2 AIX system. The auditing subsystem knows the login user ID in addition to the real and effective user IDs. In other words, to the auditing system one is either matthew as root, or simply matthew.

AUDIT PRINT COMMAND

The audit print command auditpr reads the audit trail defined by its given path argument and prints a report in "attribute file format" (see the AIX manual page for the attributes file format in the *IBM RT PC AIX Operating System Technical Reference*, Chapter 4) on the standard output. It can be invoked only by the superuser.

When invoked with no options, command auditpr prints all audit records from audit trail file path. When invoked with options, command auditpr uses the options as a filter to print only the option-selected audit records from audit trail file path. Multiple different options (e.g., -u john -g system) are AND'ed together in the filter. For each option other than -A or -B, either one name or several comma-separated names (with no imbedded white space) can be used (e.g., -g system, bin,staff).

If any auditpr command option is used, then the resulting attribute file has a default stanza that identifies the options, and those name-value pairs with a single value are factored out of the records that follow. Options with multiple values appear as commented-out comma-separated values in the default stanza. Record stanza names begin with an "r" (for record), followed by the relative record number from the path parameter, starting from 1. A comment line containing "***" separates an audit record head from an audit record tail.

If the auditing subsystem is enabled, then file /local/etc/security/audit/a_trail contains the name and enable time of the current audit trail file. File /local/etc/security/audit/a_trail.past contains the history of audit trail file names and enable/disable times.

AUDIT SYSTEM CALLS

This auditing subsystem design has four system calls; for each of these, the effective user ID of the calling process must be the superuser to use the auditing system call. (As an aside, the collective functionality of these system calls is more important than the exact number of system calls or any argument order.)

System call audit can enable (turn on) the auditing subsystem and specify an audit trail file, switch the audit trail file when auditing is already enabled, disable (turn off) the auditing subsystem, clear all the audit events, and query the on/off status of the auditing subsystem.

System call auditevents gets and sets the events that the system audits. While AIX differentiates two classes of events, and associates an event set with each class, general and special, this differentiation is of minor significance to this invention.

System call auditlog appends the "user level base event" audit record to the end of the audit trail file.

System call auditproc gets and sets the audit state of a process. System call auditproc can suspend (temporarily disable), with one exception, and then resume (enable) auditing for the current process. Suspending the auditing of this process disables standard auditing but allows the process to call the auditlog system call to append records to the audit trail. The suspend/resume state can be queried too. In addition, system call auditproc can set the general/special class status of a process, and query that status. The general/special commands of system call auditproc are intended to be invoked at login time. The general/special auditing status should, but need not, be invariant across a login session.

As should be apparent now, command audit is convenient "window dressing" that invokes system calls audit and auditevents and that use various auditing files.

HOW A TRUSTED PROCESS CAN USE AUDIT SYSTEM CALLS

A trusted process like login can use system calls auditproc and auditlog as follows. It can call auditproc to turn off auditing for the process, then it can call auditlog a few times in selective places to cut only a small number of audit records. Using auditproc and auditlog like this can help prefilter the audit trail by posting more descriptive records and avoid flooding the trail with unnecessary records.

KERNEL PART OF THE AUDITING SUBSYSTEM

This section describes several important properties of the kernel part of the auditing subsystem.

One Audit Record Per Local System Call. When the auditor selects a system call event, and when that local system call is invoked, this design appends exactly one audit trail record to the audit trail log file. To accomplish this, the kernel caches information in the "u" block of the process. In contrast, the designs in Secure Xenix (Gligor, et al., "Design and Implementation of Secure Xenix," *IEEE Transactions on Software Engineering*, Vol. SE-13, No. 2, pp. 208-221 (February 1987) and Picciotto's paper (J. Picciotto, "The Design of an Effective Auditing Subsystem," *Proceedings of the* 1987 *IEEE Symposium on Security and Privacy*, Oakland, Calif., pp. 13-22 (April 1987) may cut multiple audit records per system call.

Auditing the "Audit" Event. Care is taken to cut an audit record for the "audit on" and "audit off" events when auditing is enabled/disabled for system call audit. This item, while obvious to the reader, requires a little extra scrutiny.

When the Kernel Cannot Write an Audit Record. In this design, when the kernel cannot successfully write a record to the audit trail file, then the kernel writes a message to the console and halts (i.e., the kernel panics). This event can occur for one of several reasons, including: the audit trail file has reached its maximum size, or the file system containing the audit trail is full, or the audit trail is remote and either the remote node failed or the communication connection failed.

This design does not address the problem of a highly auditing subsystem. Rather than build high availability into each separate subsystem, the designers feel that a general mechanism for high availability should be provided (say, a configurable attribute of a file system) so that a subsystem can use it transparently, or without change to the design of the subsystem.

AUDIT TRAIL COMPRESSION

This section describes a design for on-line audit trail compression that is based on the design for audit trail compression in Picciotto's paper, as referenced above. We shall point out the significant differences below.

PICCIOTTO'S DESIGN FOR AUDIT TRAIL COMPRESSION

Picciotto's audit trail compression scheme works as follows. The kernel writes (raw, uncompressed) audit records, not directly into the audit trail file, but into a sequence of temporary bin files, each with the same fixed size. A user level daemon process runs in the background, reads uncompressed audit records from the bins, one bin at a time, and writes compressed audit records into the audit trail file. After processing a bin file, the daemon removes the bin file.

Picciotto's design maintains a kernel variable, BINNUM, that helps specify the identity of the next bin containing audit records. BINNUM is a 32-bit unsigned integer that is reset to 0 at boot time or when it wraps. When the auditing subsystem is turned on the first time, the kernel creates a control bin file named audit.bin, a well-known path name in the kernel, and writes the value of BINNUM in this file. After creating audit.bin and writing BINNUM, the kernel closes audit.bin and creates audit.binX, where X is the decimal encoding of BINNUM. For example, a 7 in audit.bin states that the next bin is audit.bin7. The first record in audit.binX is a special record that contains the audit trail file name. Audit bins are 30,000 bytes long (a compile time constant). When the kernel has written 30,000 bytes to one bin, it writes an end-of-bin record, closes that bin, increments BINNUM, and opens the next new bin.

When the system is booted, the audit compression daemon, audcomp, is started as one of the local daemons. It immediately forks a child process, audcomp_c, that is responsible for compacting one on-off auditing session. After each session, the child dies and audcomp forks a new child. The audcomp_c process waits until it finds the audit.bin file. When it finds this file, it reads BINNUM from it, then deletes audit.bin. The audcomp_c then opens audit.binX and begins reading records, compressing them and writing them to the audit trail file specified in the first record. At EOF, audcomp_c merely retries to read more data; EOF indicates that the consumer (audcomp_c) is faster than the producer (kernel). When audcomp_c reads the end-of-bin record, it first closes and deletes the current bin, opens the next bin (bin numbers are sequential), and begins to read more raw audit data.

When the auditing subsystem is turned off, the kernel writes an end-of-audit-session record to the current bin, closes the bin, and increments BINNUM.

When audcomp_c encounters the end-of-session record, it closes both its input and output files, deletes the former, and dies. Daemon audcomp then forks a new child that in turn waits for the appearance of the audit_bin control file, and the compression activity then continues.

When the audit trail file is switched while the auditing subsystem is already on, the kernel simply writes a switch-file-name record to the current bin and continues without interruption.

THE AUDIT TRAIL COMPRESSION INVENTION

Our invention satisfies the following properties that Picciotto's paper does not address: (1) it has file/directory location transparency; (2) many nodes can append audit records to one audit trail file; (3) the compression daemon is a single process and is restartable after node failures during compression; (4) the audit trail file can be on write-once-read-many media; and (5) there are no well-known file names in the kernel. In addition, the system call interface does not know about compression. After presenting elements of our invention below, we address each of the above five properties, and show that each property is satisfied.

Kernel Support for Compression. When the auditor turns on auditing with the audit command, the audit command saves the name of the audit trail file and current time in a a_trail. The audit command then calls the audit system call to turn on auditing, and the kernel checks if the audit trail file is a new file.

If the audit trail file is new, then the kernel creates the new audit trail file and a status file named x.ctl, where x is the file name component of the audit trail file. The status file and bins are created in the same directory tree as the audit trail file (not in the same directory as we shall explain below, but in a nid-named subdirectory). A nid is a node (i.e., system, computer) identifier. The kernel then writes three numbers into the status file, initially (1, 0, 0) and sets kernel variable BINNUM to 0. The three numbers in the status file are nextBinNumber, lowBinNumber, and compressionInProgress. Field nextBinNumber is the next bin number to be used; only the kernel writes this value, not the audit daemon. Field lowBinNumber contains the bin number of the lowest bin file that is not compressed, and compressionInProgress is a flag that indicates if compression is in progress. Except for initial creation, only the audit daemon writes fields lowBinNumber and compressionInProgress. So, initially (1, 0, 0) means that 1 is the next bin number to be used, 0 is the number of the lowest bin that is not compressed, and compression is not in progress. Both lowBinNumber and nextBinNumber count from 0 to 999 then reset to 0 again, and so on. Using three digits for up to 1,000 bins was thought to be enough buffering to offset any producer/consumer (i.e., kernel/daemon) speed mismatch. Other choices for the number of bits (100, 1,000, 256, . . . ) would not change the principles of this invention.

If the audit trail file already exists, then the kernel reads nextBinNumber from the existing audit status file and sets its BINNUM to nextBinNumber. The kernel also compares the nextBinNumber and lowBinNumber in the status file. If the two numbers are equal, then the compression daemon has not compressed previously generated audit bin files, and the kernel does not allow auditing to be turned on this audit trail file. In the normal case, this situation should not happen.

After determining BINNUM, the kernel creates a temporary bin file named x.y, where x is as before and y is the three-digit decimal representation of BINNUM. Since the maximum file name length in AIX is currently fourteen, a four character suffix implies at most a ten character prefix. After creating x.y, the kernel writes audit records into this bin. When the size of this bin would exceed a predetermined limit, the kernel writes an end-of-bin record, closes the bin, increments BINNUM in the kernel and nextBinNumber in the status file, creates the new bin file, then starts using the new bin. Again, to prevent possible error in the compression daemon, the kernel checks if BINNUM and lowBinNumber are equal before creating the next bin file. If BINNUM and lowBinNumber are equal, then the kernel writes a warning message on the console, restores the previous BINNUM, and does not switch the bin file.

When the auditor turns off auditing with the audit command, the audit command removes the record from a_trail, appends the current time to the end of the record, sets the flag that indicates that this audit trail is not compressed yet, and appends the entire record to a_trail.past. When the kernel is told to turn off auditing, it writes an end-of-session record into the current bin file, closes it, and turns off kernel auditing.

When the auditor changes the audit trail file and the auditing subsystem is already on, the kernel writes an end-of-session record in the bin, closes the bin, and proceeds as it would when auditing is turned on.

Compression Daemon. The audit compression daemon /etc/auditd is a background process that is started when the system is booted. The audit daemon compresses one auditing session at a time, and it compresses older sessions before newer ones. The audit daemon uses files a_trail.past and a_trail. File a_trail.past contains data on all closed sessions, including if the session has been compressed or not. File a_trail contains data on the existing open session, if any.

The audit daemon works as follows. First it does recovery. Assuming that auditing is off, it examines a_trail. If a_trail is not empty, then a failure occurred during an open session. The audit daemon reads the status file for the open trail, appends an end-of-session record to the last bin file, appends the end-time'd a_trail entry to a_trail.past, and empties a_trail. These actions reestablish the "invariants" of a_trail.past and a_trail. Second, the audit daemon reestablishes the session-compression invariant as follows. It searches the audit trail forward and identifies the youngest uncompressed session. If such an uncompressed session exists, then it searches the audit trail backwards for the first record with this nid, and gets the bin number. If the compressionInProgress flag is 1, then cleanup is necessary. Cleanup here means possibly removing an already compressed bin file, then updating lowBinNumber and compressionInProgress in the status file. Third, the audit daemon disassociates from the process group and controlling terminal; it forks a child and exits the parent. Fourth, the audit daemon begins its normal compression mode, compressing one session at a time, and compressing an older session before a newer one.

Session compression uses the pack command algorithm, a Huffman encoding algorithm. This algorithm requires that all data be read before it can start compression. If the daemon encounters an EOF, this means that the consumer (daemon) is faster than the producer (kernel). Thus, on EOF the daemon waits and tries to read more later. The true end of a bin is indicated by an end-of-bin or switch-bin record. To compress a bin, the daemon writes a 1 for compressionInProgress in the status file, compresses the bin and writes a three-part frame to the audit trail file in one atomic write, removes the bin file, and writes ++lowBinNumber and compressionInProgress value 0 to the status file.

The three-part frame consists of (head, body, tail), where the head and tail are identical and fixed size, and the body consists of a compressed bin. The head (and tail) part consists of (id, bin#, before_length, after_length, nid) as described above. With three-part frames with identical head-tail pairs and with length values in each, we can read the audit trail forwards or backwards.

File/Directory Location Transparency. In our invention, a_state, a_trail and a trail.past are node-specific, so they reside under /local in directory /local/etc/security/audit. Furthermore, the bins are node-specific. Since we do not want to introduce any well-known pathnames into the kernel, we can create bins somewhere under the directory that contains the audit trail file, which the kernel determines at audit-on time. If we create these bins in the same directory as the audit trail file and if this directory is remote, then it is possible for bin name collisions; two or more nodes can "step on" the same bins. To avoid this problem, we can create bins in a nid-specific (say, nid-named) subdirectory of the directory containing the audit trail file. The audit daemon /etc/auditd reads a_trail to find the bins and audit trail file. This design is oblivious to the local/remote location of the audit trail file and the directory that contains the audit trail file, because node-specific auditing data is segregated.

Many Nodes Can Feed One Audit Trail File. We use DS transparency to write audit records from many nodes to a single audit trail file. We need to show that the auditpr command does not get confused; it can unambiguously read the audit trail file and decompresses audit trail records potentially from many source nodes. The problem that we need to solve is how to decompress the interleaved compressed audit records from more than one node. We solve this problem by compressing each bin in one step, prepend an uncompressed checkpoint header to the compressed bin, append an uncompressed checkpoint trailer to the compressed bin, and append the (uncompressed head, compressed bin, uncompressed tail) to the audit trail in one atomic write. We do the atomic write by first writing the record to a temporary file, then reading it in one step with one read system call then appending it in one step with one write system call.

Write-Once-Read-Many Media for Audit Trail File. For writing, we always open the audit trail file for append-only access, and we write (uncompressed checkpoint head, compressed bin, uncompressed checkpoint tail) frames of records in one atomic write.

No Well-Known Pathnames in the Kernel. By design, the kernel gets all the pathname information it needs to know from the audit trail name argument of the audit system call.

Compression Daemon Recovery and Restartability. The next section explains this.

RECOVERY AND RESTARTABILITY OF AUDIT DAEMON

This section focuses on the recovery and restartability of the audit daemon. By "recovery" we mean that, after a node failure, the daemon can resume normal operation. By "restartability" we mean that, if we execute any "prefix" of the code and then a node failure occurs, then we can obliviously reexecute the code from the beginning, and, that this can occur any number of times.

Figure 6:
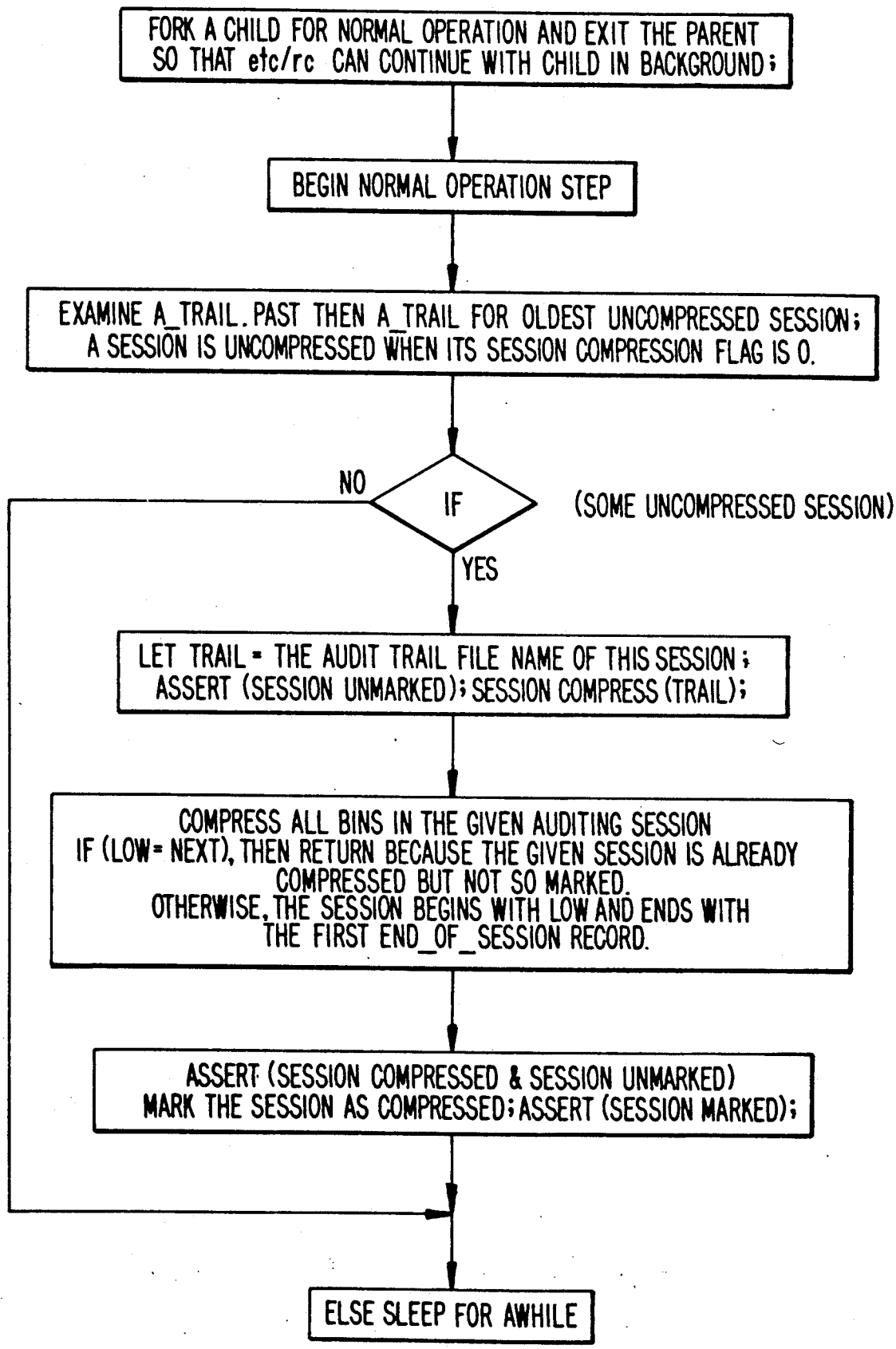
FIG. 6 is a flow diagram of the audit daemon process.

To help explain the audit daemon invention, Appendix A contains pseudo-code (skeleton, C-like code) for the audit daemon. FIG. 6 is a flow diagram of the audit daemon code of Appendix A. This code has two functions: main() and sessionCompress(). Function main() has two large steps, a recovery step then a normal operation step. Function sessionCompress() compresses all bins in the given auditing session. An auditing session consists of all recorded audit events between an on-off or on-switch or switch-switch or switch-off or on-failure or switch-failure node events, where "failure" means a node failure. An auditing session is either open or closed. A closed auditing session ends with an end-of-session record, whereas an open auditing session does not. A session can be open if the auditing subsystem is enabled and in normal operation or if a failure occurred while the auditing subsystem was enabled.

This section has four subsections: invariants, recovery, normal operation, and restartability. Here, recovery simply reestablishes certain invariant assertions of the design, so we must review these invariants before we discuss recovery.

INVARIANTS

To understand the audit daemon pseudo-code, it is necessary to understand the invariants of file a_trail, of file a_trail.past, and of function sessionCompress().

The invariant of a_trail is that it contains data on an existing open audit session, if any. If there is no existing open session, then file a_trail exists but is empty.

The invariant of a_trail.past is that it contains data on all closed audit sessions, sorted by start time. Associated with each closed audit session in file a_trail.past is a start time and a stop time and a compression-completion flag.

The invariant associated with function sessionCompress() is assertion a0 (with label a0) as defined in the pseudo-code. Function sessionCompress() compresses all bins in the given auditing session; it can be used for compressing bins in a closed or open session. Function main() makes sure that older sessions are compressed before younger (newer) ones. Assertion a0 states that, for the current bin file b, bin compression is not in progress and file b exists and b is not already on the audit trail. In other words, sessionCompress() is ready.

RECOVERY

Recovery, the first large step in function main(), makes sure that the invariants for a_trail and a_trail.past and sessionCompress() are established, and reestablishes them if necessary as follows.

If a_trail is not empty, then a node failure occurred during an open auditing session. To reestablish the invariants of a_trail and a_trail.past, read the a_trail entry, read Next (next bin to be compressed) from the x.ctl file, append an end-of-session record to the end of bin Next-1 if it is not already there, if the last record of a_trail.past is not this one then append the end-time'd a_trail entry to a_trail.past, and empty a_trail.

To reestablish the invariant of sessionCompress(), search a_trail.past forwards and identify the youngest uncompressed session. If an uncompressed session exists, then fix things by scrutinizing assertions a1-a5 and intervening steps s1-s4 at the bottom of function sessionCompress(), and using a simple case analysis. The code in main() to reestablish the invariant of sessionCompress() either removes a bin file or rewrites the x.ctl file or both. The flag variable in sessionCompress() is 1 when compression of bin b is in progress and 0 otherwise. The value of this flag is written to stable disk storage (with system calls write and fsync, the latter a per file sync in AIX) as necessary for recovery to know the state of compression of bin b.

NORMAL OPERATION

In normal operation, the audit daemon compresses one auditing session at a time, and it compresses older sessions before newer ones. To find the oldest uncompressed session, the audit daemon examines a_trail.past then a_trail and looks for the oldest entry with a session compression flag of 0. If it finds such an uncompressed session, then it calls function sessionCompress(), then afterwards it marks the session as compressed in a_trail.past.

Function sessionCompress(trail) compresses all bins in the given auditing session. It uses file x.ctl to look for the next bin to compress. If the next bin does not contain an end-of-bin or end-of-session record, then sessionCompress() sleeps for awhile and checks again. When a bin is available, it sets the compression in progress flag to 1 and writes this to file x.ctl, then compresses the bin and appends the three-part frame to the audit trail, then it removes the bin file, then it sets the compression in progress flag to 0 and increments the low bin number and writes these two values to file x.ctl. As long as no end-of-session record is found, it continues to compress successive bins this way.

RESTARTABILITY

The code in functions main() and sessionCompress() is restartable. This pseudo-code shows that for all the steps, a failure and then reexecution of already executed steps makes no difference.

SUMMARY

We have described a computer auditing subsystem that satisfies the following requirements and properties:
(a) Software environment requirements:
   runs in a UNIX (or AIX or UNIX-like) operating system environment with a hierarchical file system and with an atomic write operation like the write () system call, and
   runs in an operating system environment with local/remote file/directory location transparency, such as a "virtual mount" or "remote mount" based mechanism (e.g.,) IBM RT PC AIX Distributed Services, also known as DS);
(b) Security requirement:
   provides an auditing framework to help satisfy the Audit Requirement for classes C2 to A1 of the Orange Book;
(c) Invention properties:
   performs on-line compression of the audit trail log file using a single audit daemon process per system, has a restartable audit daemon that recovers after node failures,
   for DS or a similar mechanism, has file/directory location transparency,
   for DS or a similar mechanism, lets many nodes append audit records to one audit trail log file, and captures the login user ID, can prevent login as a pseudo-user like root, but can allow su ("substitute user") to a pseudo-user like root.
(d) Additional properties:
   lets the audit trail log file be on write-once media, and
   has no well-known file names in the operating system kernel part of the auditing subsystem, and cuts exactly one audit trail record per system call if the corresponding base event is enabled and exercised.

In the current design, the default bin size is 20,480 bytes (20 KB = 10 × 2048, or the 10 "directs" in an AIX inode structure), and compression averages about 50 percent.

CROSS REFERENCE TO RELATED APPLICATIONS

This application is related in subject matter to the following applications filed on Feb. 13, 1987 and assigned to IBM Corporation:

Application Ser. No. 07/014,899 filed by A. Chang, G. H. Neuman, A. A. Shaheen-Gouda, and T. A. Smith for "A System and Method for Using Cached Data at a Local Node After Re-Opening a File at a Remote Node in a Distributed Networking Environment" now U.S. Pat. No. 4,897,781.

Application Ser. No. 07/014,884 filed by D. W. Johnson, L. W. Henson, A. A. Shaheen-Gouda, and T. A. Smith for "A System and Method for Version Level Negotiation" now abandoned file Parent of a File Wrapper Continuation (FWC) application Ser. No. 07/352,711 filed on May 11, 1989.

Application Ser. No. 07/014,900 filed by D. W. Johnson, A. A. Shaheen-Gouda, T. A. Smith for "Distributed File Access Structure Lock" now abaandoned file Parent of a File Wrapper Continuation (FWC) application Ser. No. 07/418,750 filed on Oct. 4, 1989.

Application Ser. No. 07/014,891 filed by L. W. Henson, A. A. Shaheen-Gouda, and T. A. Smith for "Distributed File and Record Locking".

Application Ser. No. 07/014,892 filed by D. W. Johnson, L. K. Loucks, C. H. Sauer, and T. A. Smith for "Single System Image" now abandoned file Parent of a File Wrapper Continuation (FWC) application Ser. No. 07/401,546 filed on Sep. 1, 1989.

Application Ser. No. 07/014,888 filed by D. W. Johnson, L. K. Loucks, A. A. Shaheen-Gouda for "Interprocess Communication Queue Location Transparency."

Application Ser. No. 07/014,889 filed by D. W. Johnson, A. A. Shaheen-Gouda, and T. A. Smith for "Directory Cache Management in a Distributed Data Processing System."

The disclosures of the foregoing copending applications are incorporated herein by reference.

Although a specific embodiment of the invention has been disclosed it would be understood by those having skill in the art that the minor changes can be made to the specific embodiment without departing from the spirit and the scope of the invention.

Table 1

```
 1   # @(#)a_event   7.2 87/11/06 15:29:03
 2   # Audit Event Table
 3   # format for a base event is:
 4   #       event, event, ...
 5   # format for an administrative event is:
 6   #       administrative_event: event, event, ...
 7   #
 8   # system call base events
 9           access
10           acct, alarm, audit, auditevents, auditlog, auditproc
11           brk
12           chdir, chmod, chown, chownx, chroot, close, creat
13           disclaim, dsstate, dup
14           exec
15           fclear, fcntl, ffullstat, fork, fstat, fsync, ftruncate, fullstat
16           getgid, getgroups, getuid
17           ioctl, iplvm
18           kill
19           link, loadtbl, lock, lockf, lookup
20           mkdir, mknod, mntctl, mount, msgsys
21           nice
22           open
23           pause, pipe, profil, ptrace
24           read, reboot, rename, rexit, rmdir
25           seek, select, semsys, setgid, setgroups, setpgrp, setuid, sgetpid
26           shmsys, sigblock, sigcleanup, signal, sigpause, sigsetmask, sigstack
27           sigvec, stat, stime, sync
28           time, times
29           ulimit, umask, umount, uname, unlink, usrinfo, utime, utssys, uvmount
30           vhangup, vmount
31           wait, waitvm, write
32   # socket events
33           accept
34           bind
35           connect
36           recv
37           send
38           sethostid
39           sethostname
40           shutdown
41   # other base events
42           adduser_fail
43           adduser_ok
44           at_fail
45           at_ok
46           chparm_ok
47           device_ok
48           dsipc_fail
49           dsipc_ok
50           dskproc       # ds server audit event
51           dsrpc         # ds client audit event
52           errstop_ok
53           exit          # internal kernel exit routine
54           fsck_ok
55           installp_ok
56           login_fail    # login process failed
57           login_ok      # login process successfully completed
58           logout_ok     # log out successful
59           mdisk_ok
60           mount_ok
61           newgrp_fail
```

```
62          newgrp_ok
63          passwd_fail     # change password failed
64          passwd_ok       # change password completed
65          pdelay_ok
66          pdisable_ok
67          penable_ok
68          phold_ok
69          print_cancel
70          print_request
71          print_start
72          pshare_ok
73          pstart_ok
74          shutdown_ok
75          sinstallck
76          sm_initaliases  # sendmail
77          sm_ok           # sendmail
78          su_fail
79          su_ok
80          ugsync
81          umount_fail
82          umount_ok
83          varyoff_ok
84          varyon_ok
85  # TCP/IP command events
86          hostname_set
87          netconfig_add, netconfig_del
88          route_add, route_del
89          setclock_set
90          tn_login_fail, tn_login_ok
91          tnd_login_fail,tnd_login_ok
92          xftpd_login_fail, xftpd_login_ok
93          xftp_login_fail, xftp_login_ok
94  # administrative events
95          login:          login_fail,login_ok,logout_ok,su_fail,su_ok, \
96                          tn_login_fail,tn_login_ok, \
97                          tnd_login_fail,tnd_login_ok, \
98                          xftp_login_fail,xftp_login_ok, \
99                          xftpd_login_fail,xftpd_login_ok
100         proc_create:    fork                # process create event
101         proc_delete:    kill,rexit,exit     # process delete event
102         obj_create:     creat,mknod,mkdir,chdir # object create event
103         obj_delete:     unlink,rmdir        # object delete event
104         ds_client:      dsrpc               # ds client audit event
105         ds_server:      dskproc             # ds server audit event
```

Appendix A. Pseudo-Code for the Audit Daemon.

```
/*
 * Audit Daemon pseudo-code, /etc/auditd
 *
 * In /etc/rc, say
 *     # Run audit daemon.
 *     /etc/auditd         # no &
 */ main()
{
    /* begin recovery step */
        /* Assume that auditing is off during the recovery step. */
        assert(auditing is off);
        /*
         * First, reestablish the invariants of a_trail.past and a_trail, where
         *      invariant(a.trail.past) = "data on all closed sessions"
         *      invariant(a_trail) = "data on existing open session"
         */
        if (a_trail is not empty)
        {
            assert(node failure occurred during open auditing session);
            read a_trail entry: trail, begin_time;
            let x = basename(trail);
            /* File x.ctl contains values Next, Low, and Flag. */
            read Next from x.ctl file;
            if (end_of_session record not already at end of bin file (Next-1))
                append end_of_session record to bin file (Next-1);
            if (begin time of last record in a_trail.past != begin_time)
                append end_time'd a_trail entry to a_trail.past;
            empty a_trail;
        }
        assert(invariants of a_trail.past and a_trail reestablished);

/* Second, reestablish the sessionCompression() invariant a0. */
        search a_trail.past forwards, identify the youngest uncompressed session;
        if (an uncompressed session exists)
        {
            /*
             * N.B. This code is based on a fine analysis of assertions a0-a5
             * and steps s1-s4 in function sessionCompress().
             */
            let Trail = its audit trail file;
            let x = basename(Trail);
            read Low and Flag from x.ctl file;
            if (Flag == 1)
            {
                search Trail backwards for the first record with this nid, and get bin#;
                Found = (Low == bin#);   /* true or false */
                if (bin file x.Low exists && Found) remove file x.Low;
                if (Found) ++Low;
                Flag = 0;
                write Low and Flag to x.ctl;
            }
        } assert(recovery done);
    /* end recovery step */

/* more on next page ... */
    /* begin fork step */
        fork a child for normal operation and exit the parent
            so that /etc/rc can continue with child in background;
    /* end fork step */

/* begin normal operation step */
        /*
         * Compress one auditing session at a time.
         * Compress older sessions before newer ones.
         */
```

```
        for (;;)
        {
            examine a_trail.past then a_trail for oldest uncompressed session;
            /* A session is uncompressed when its session compression flag is 0. */
            if (some uncompressed session)
            {
                let trail = the audit trail file name of this session;
                assert(session unmarked);
                sessionCompress(trail);
                assert(session compressed && session unmarked);
                mark the session as compressed;
                assert(session marked);
            }
            else
                sleep for awhile
        }
} /* last line of main(); see next page for sessionCompress() */
sessionCompress(trail)
    char *trail;   /* an audit trail file name:  /dirname/basename */
    /*
     * Compress all bins in the given auditing session.
     * If (Low == Next), then return because the given session is already
     *     compressed but not so marked.
     * Otherwise, the session begins with Low and ends with
     *     the first end_of_session record.
     */
{ let x = basename(trail);
    read Low, Next, and Flag from x.ctl file;
    let b = Low;   /* entry-value of Low */
a0: assert(Flag == 0 && file b exists && b not on trail);
    if (Low == Next)
        return;   /* This session is already compressed but not so marked. */ done = FALSE;
    while (!done)
    {
        /* First, read bin b; wait awhile if bin b is not ready. */
        for (;;)
        {
            read bin b;
            if (b contains end_of_bin or end_of_session record)
            {
                done = "bin b contains end_of_session record";
                break;
            }
            sleep for awhile;
        }

/* Second, append the compressed bin b to the trail and remove file b. */
a1:     assert(Flag == 0 && file b exists && b not on trail);
s1:     Flag = 1; write Flag to x.ctl;
a2:     assert(Flag == 1 && file b exists && b not on trail);
s2:     compress bin b; append the 3-part record (head, body, tail) to trail;
a3:     assert(Flag == 1 && file b exists && b on trail);
s3:     remove bin file b;
a4:     assert(Flag == 1 && no file b exists && b on trail);
s4:     Flag = 0; ++Low; write Flag and Low to x.ctl;
a5:     assert(Flag == 0 && no file b exists && b on trail);
    } /* end while */
} /* last line of sessionCompress() */
```

End of Appendix A. Pseudo-Code for the Audit Daemon.

What is claimed is:

1. A distributed, security auditing subsystem for performing on-line auditing of events in each of a plurality of client processors in a system and performing on-line compression of an audit trail of said events in a server processor in the system, comprising:

a first security audit daemon in a first client processor in said system for monitoring the occurrence of a defined set of events effecting data security of said first client processor and preparing first security audit records in response to the occurrence therein of said events;

a distributed services means in said first client processor, for performing a remote mount of a security audit directory in a server processor in said system containing first temporary bin files associated with said first client processor;

said first audit daemon in said first client processor writing said first audit records to said first temporary bin files in said remotely mounted security audit directory in said server processor;

said first audit daemon in said first client processor further including a data compression means for operating on records in said first temporary bin files in said server processor containing said first audit records, to compress selected records therein and write the compressed records with a first type identifier to a permanent audit trail file in said remotely mounted security audit directory in said server processor;

a second security audit daemon in a second client processor in said system for monitoring the occurrence of a defined set of events effecting data security of said second client processor and preparing second security audit records in response to the occurrence therein of said events;

a distributed services means in said second client processor, for performing a remote mount of said security audit directory in said server processor containing second temporary bin files associated with said second client processor;

said second audit daemon in said second client processor writing said second audit records to said second temporary bin files in said remotely mounted security audit directory in said server processor; and said second audit daemon in said second client processor further including a data compression means for operating on records in said second temporary bin files in said server processor containing said second audit records, to compress selected records therein and write the compressed records with a second type identifier to said permanent audit trail file in said remotely mounted security audit directory in said server processor.

2. The distributed auditing subsystem of claim 13, wherein said permanent audit trail file further comprises:

a plurality of data frames organized with a header portion, a compressed bin portion, and a trailing portion;

said header portion including the number of bytes in the compressed bin associated therewith and the identity of a client node which was the source of the audit information in said bin;

said trailing portion including the number of bytes in said associated compressed bin and the identity of said client node; and said byte count in said header portion and said byte count in said trailing portion enabling said permanent audit trail file to be searched in either the forward or reverse direction.

3. A method for distributed, security auditing of events occurring in each of a plurality of client processors in a system and the compression of auditing information generated thereby in a server processor in the system, comprising the steps of:

monitoring the occurrence of a defined set of events effecting data security of a first client processor in said system, with a first security audit daemon running in said first client processor;

performing a remote mounting with said first client processor, of a security audit directory in a server processor in said system, containing first temporary bin files associated with said first client processor;

writing first audit records with said first audit daemon in response to said events occurring in said first client processor, to said first temporary bin files in said remotely mounted security audit directory in said server processor;

selectively compressing with said first audit daemon in said first client processor records in said first temporary bin files and writing resulting first compressed bins with a first type identifier to a permanent audit trail file in said remotely mounted security audit directory in said server processor;

monitoring the occurrence of a defined set of events effecting data security of a second client processor in said system, with a second security audit daemon running in said second client processor;

performing a remote mounting with said second client processor, of said security audit directory in said server processor in said system, containing second temporary bin files associated with said second client processor;

writing second audit records with said second audit daemon in response to said events occurring in said second client processor, to said second temporary bin files in said remotely mounted security audit directory in said server processor; and selectively compressing with said second audit daemon in said second client processor records in said second temporary bin files and writing resulting second compressed bins with a second type identifier to said permanent audit trail file in said remotely mounted security audit directory in said server processor.

4. The method for distributed auditing of claim 3, wherein said first audit daemon in said first client processor is a UNIX-type process operating under a UNIX-type operating system, said first audit daemon performing the steps of:

issuing a fork system call to fork a child process for normal operation;

determining the oldest uncompressed bin in said first temporary bin files;

compressing all bins in said first temporary bin file, starting with said oldest uncompressed bin; and writing said compressed bins to said permanent audit trail file.

5. The method of claim 4 wherein said audit daemon is a user-lever process in said client processor.

6. The method of claim 4 wherein said audit daemon is a kernel level process in said client processor.

7. The method of claim 4 wherein said permanent audit trail file is recorded on a write-once-read-many recording medium.

8. The method of claim 4 wherein said first compressed bins are stored in said permanent audit trail file with a header portion and a trailer portion, said header portion including a byte count of the number of bytes in said associated compressed bin and the identity of said first client processor and said trailer portion including a byte count of the number of bytes in said associated compressed bin and the identity of said first client processor, thereby enabling said permanent audit trail file to be searched in either direction.

9. The method of claim 8 which further comprises the steps of:

restarting said first audit daemon upon recovery after a failure of said server processor or said first client processor.

10. The method of claim 3, wherein said defined set of events further comprises the steps of:
 defining a set of elementary events;
 defining an optional list of administrative events, where each administrative event in the list is a set of elementary events or previously defined administrative events or both;
 defining a first set of events to be audited for a first set of users; and
 defining a second set of events to be audited for a second set of users.

* * * * *

UNITED STATES PATENT AND TRADEMARK OFFICE
CERTIFICATE OF CORRECTION

PATENT NO. : 5,032,979

DATED : July 16, 1991

INVENTOR(S) : Matthew S. Hecht, et. al.

It is certified that error appears in the above-identified patent and that said Letters Patent is hereby corrected as shown below:

Col. 37, Claim 2, line 56, change "13" to -- 1.

Signed and Sealed this

Twenty-ninth Day of December, 1992

Attest:

DOUGLAS B. COMER

*Attesting Officer*   *Acting Commissioner of Patents and Trademarks*